United States Patent
Tsuchiya et al.

(10) Patent No.: US 6,768,514 B1
(45) Date of Patent: Jul. 27, 2004

(54) IMAGE PROCESSING APPARATUS AND IMAGE PROCESSING METHOD

(75) Inventors: Takashi Tsuchiya, Tokyo (JP); Masami Ogata, Kanagawa (JP); Kazuhiko Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/441,855

(22) Filed: Nov. 17, 1999

(30) Foreign Application Priority Data

Nov. 18, 1998 (JP) .......................................... 10-327736

(51) Int. Cl.⁷ .............................................. H04N 5/208
(52) U.S. Cl. ........................ 348/252; 358/461; 358/521
(58) Field of Search ................................. 358/448, 521, 358/450, 453, 461

(56) References Cited

U.S. PATENT DOCUMENTS 5,517,333 A  *  5/1996  Tamura et al. .............. 358/518
6,198,841 B1  *  3/2001  Toyama et al. ............. 382/164

* cited by examiner

*Primary Examiner*—Andrew Christensen
*Assistant Examiner*—Dorothy Wu
(74) *Attorney, Agent, or Firm*—Frommer Lawrence & Haug LLP; William S. Frommer; Bruno Polito

(57) ABSTRACT

The present invention relates to an image processing apparatus and an image processing method, and it is applicable to a variety of kinds of image processing apparatus such as television receivers, video tape recorders, television cameras, printers, etc., and it makes it possible to correct the gradation of an image avoiding the lowering of partial contrast effectively. In this case, an excessive emphasis of an outline can be avoided.

22 Claims, 18 Drawing Sheets

| Ye | Cy | Ye | Cy |
|----|----|----|----|
| Mg | G  | Mg | G  |
| Ye | Cy | Ye | Cy |
| G  | Mg | G  | Mg |

2

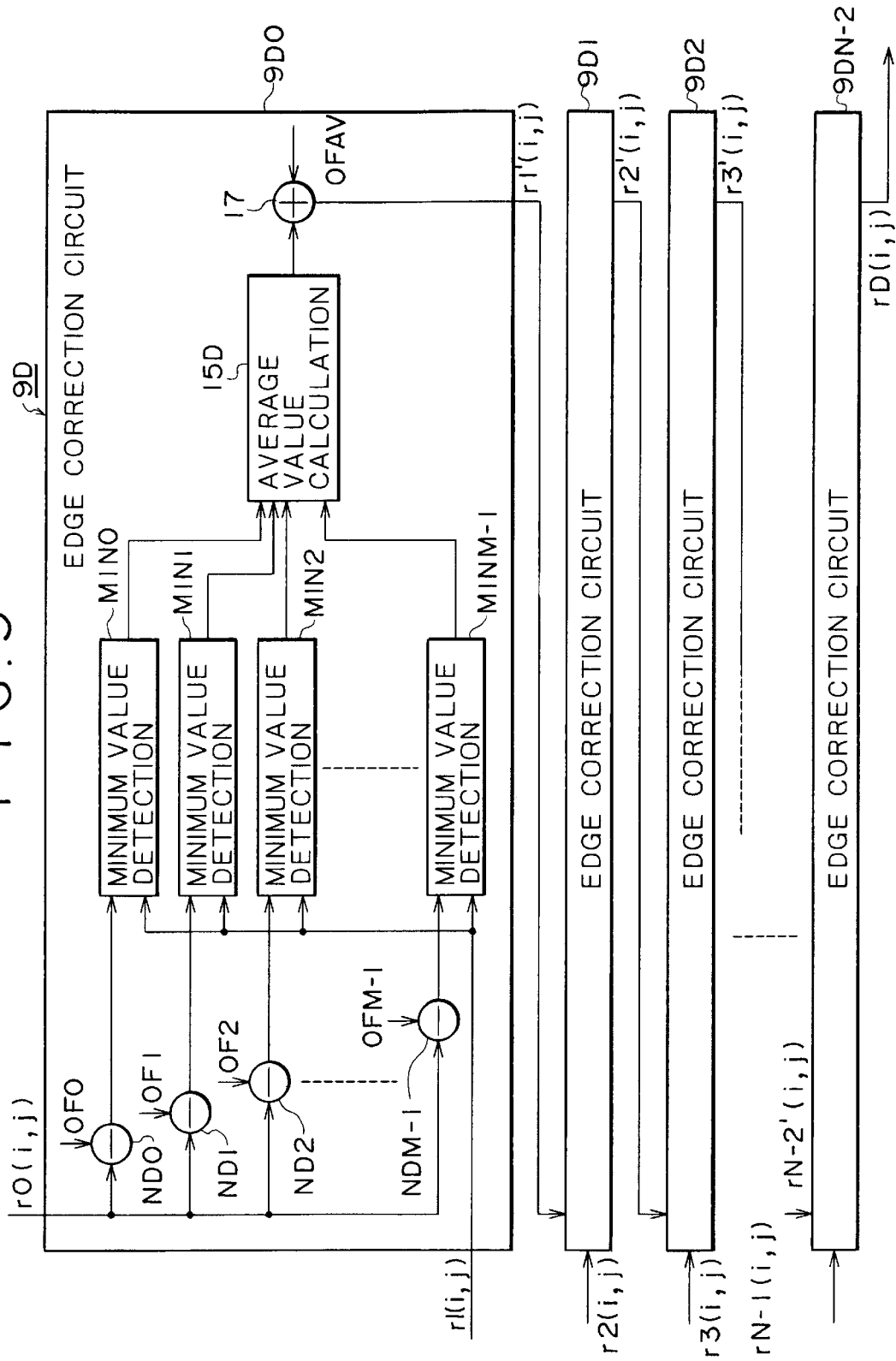

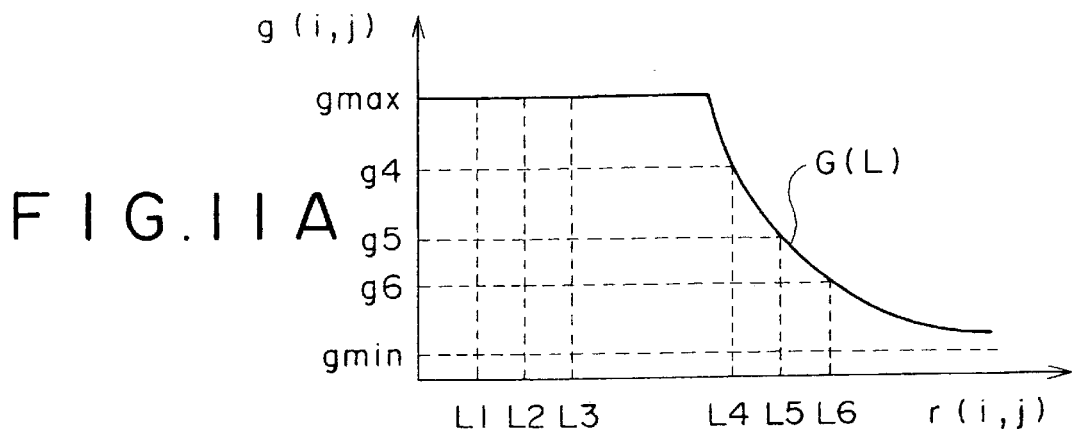
FIG.11A
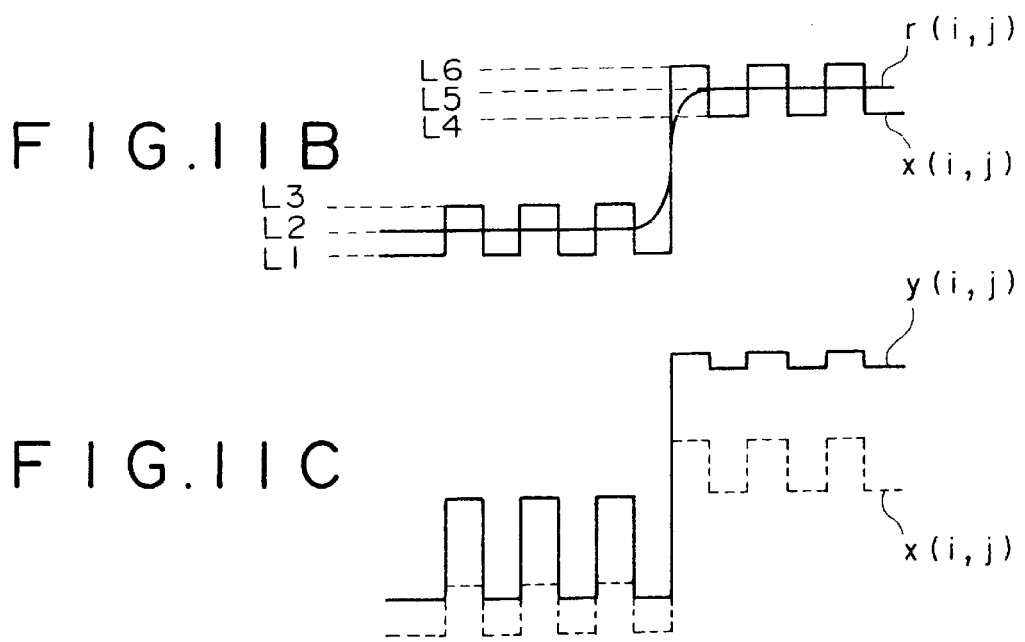
FIG.11B
FIG.11C
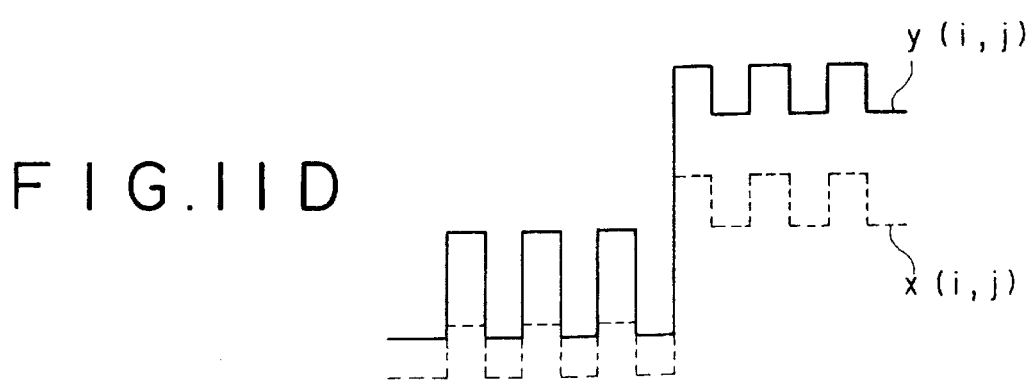
FIG.11D

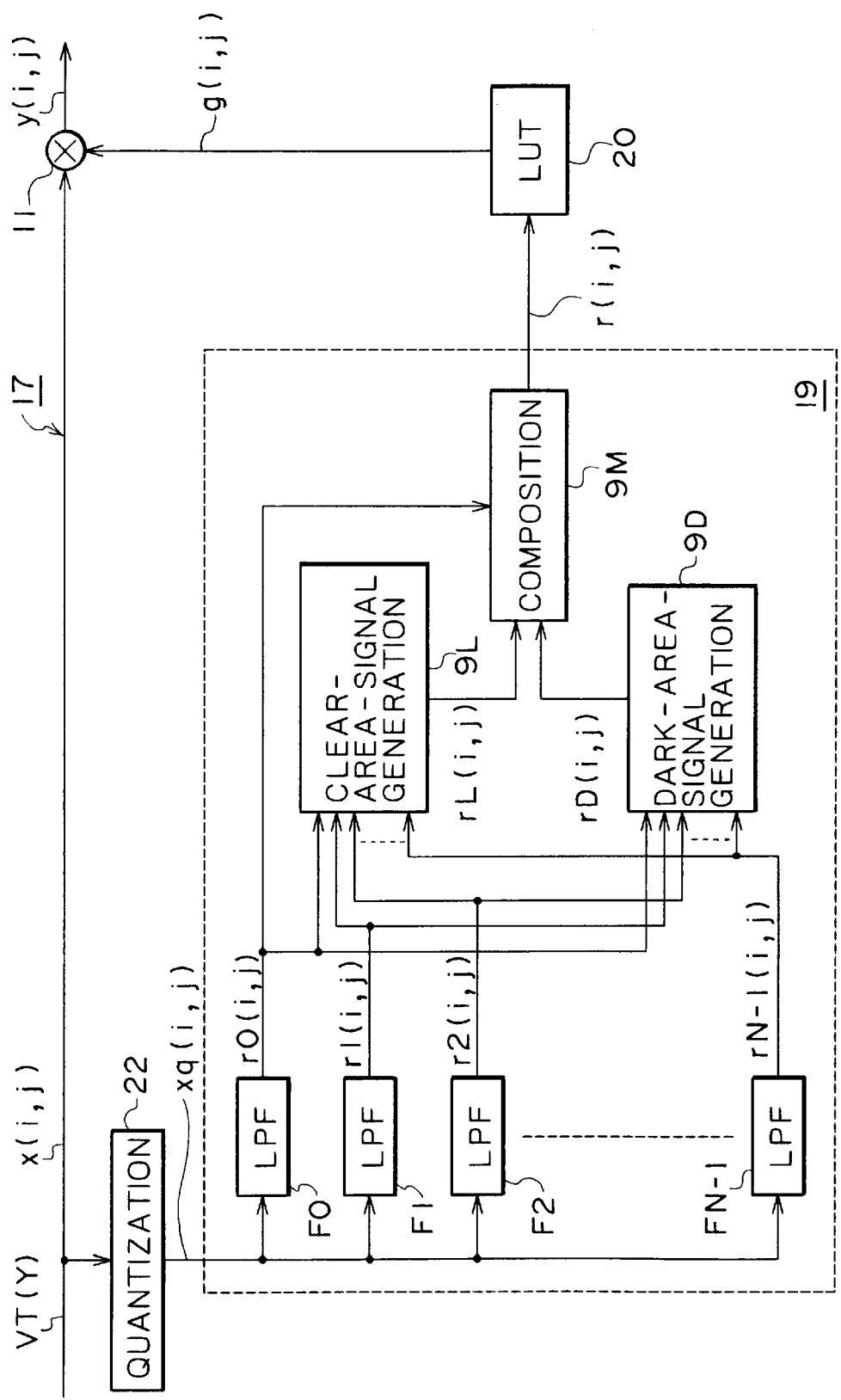

F I G. 18
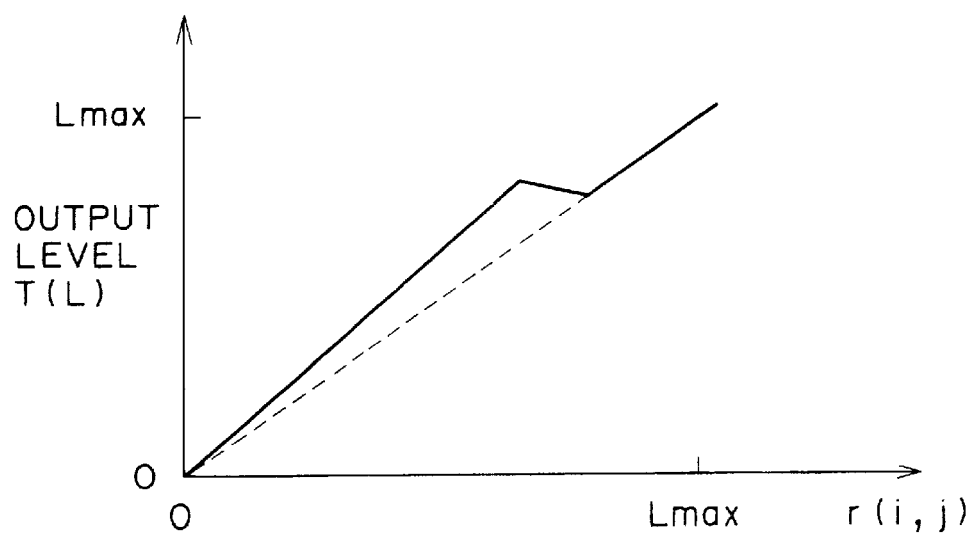
F I G. 19
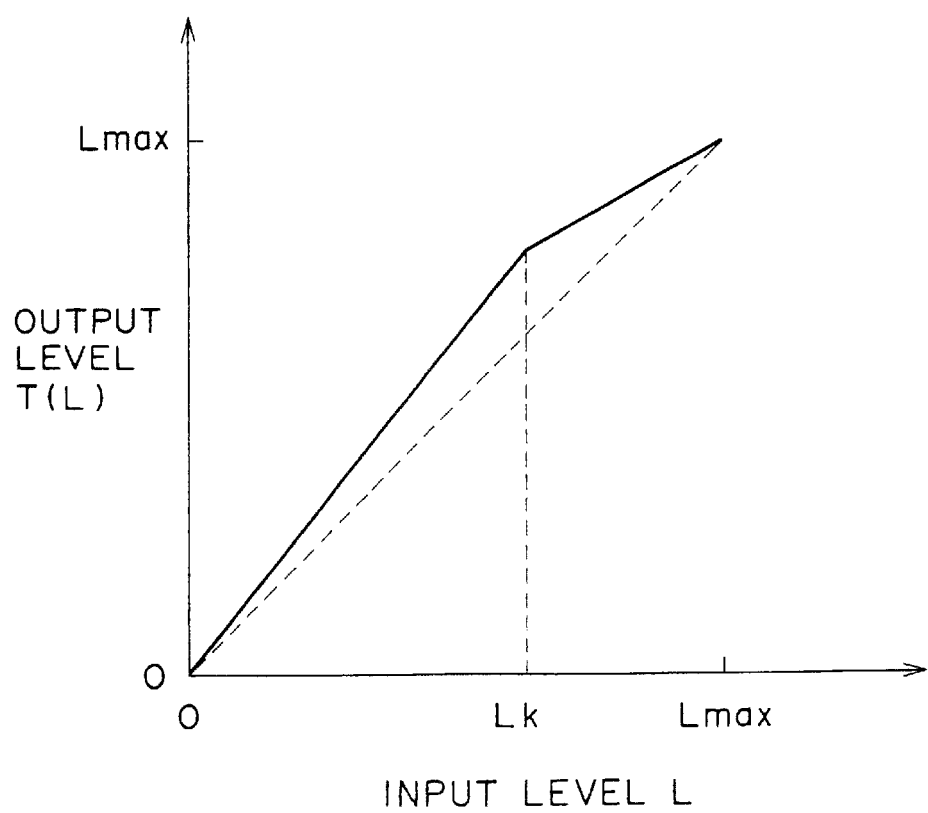

F I G. 20
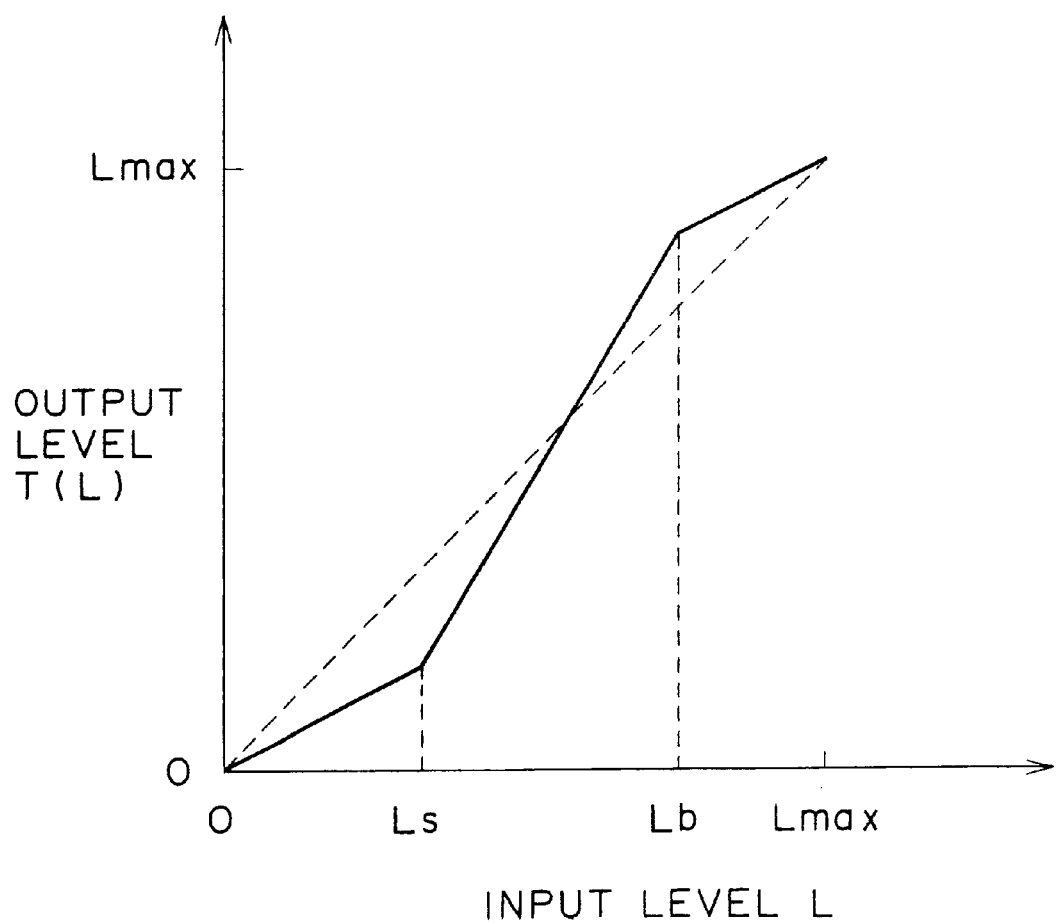

IMAGE PROCESSING APPARATUS AND IMAGE PROCESSING METHOD

BACKGROUND OF THE INVENTION

The present invention relates to an image processing apparatus and an image processing method, and it can be applied to image processing devices such as a television receiver, a video tape recorder, a television camera or a printer. In the present invention, an area to which an input image data belong is judged, and a judgement result is obtained and a correction coefficient is generated corresponding to the judgement result when pixel values are corrected, with the approach to an edge, the resolution of the judgement result is controlled to increase directly or indirectly; thereby, the gradation can be corrected in avoiding effectively the deterioration of partial contrast. In this case, users shall be careful not to emphasize the outline excessively.

In the conventional image processing apparatus such as a television camera, the gradation of image data obtained through an image input means, for example a photographing means, is corrected within the apparatus and after that the data is output.

FIG. 19 shows characteristic curves showing the input/output characteristics of a signal processing circuit to be applied to a gradation correction processing. A signal processing circuit of this kind decreases the gain when the input level L becomes higher than a predetermined reference level Lk. Thereby, in the case of a signal processing circuit of this kind, when the input level becomes higher than a reference level Lk, the signal level is output being oppressed. In this case, the gradation is corrected at the sacrifice of the contrast in a part where signal level is high.

In the characteristic curve chart shown in FIG. 19, the axis of abscissas expresses the pixel value 1, the input level of the image data, and the axis of ordinates expresses the pixel value T(L), the output level of the image data, and Lmax expresses the maximum level which respective pixels in the input/output image are able to take. Hereinafter, the function showing the input/output relationship as shown in the characteristic curve chart is called a level conversion function.

FIG. 20 shows a characteristic curve chart showing input/output characteristics of the signal processing circuit of the same kind. The signal processing circuit being constituted with the level conversion function decreases the gain when the input level L is lower than the first reference level Ls and when the input level is higher than the second reference level Lb. Thereby, the signal processing circuit corrects gradation at the sacrifice of the contrast in a part where signal level is low and in a part where signal level is high.

On the contrary, in the image processing using a computer, it is arranged to correct gradation by histogram equalization.

The histogram equalization denotes a method in which a level conversion function is appropriately varied corresponding to the frequency distribution of pixel values in the input image data, that is, a method for correcting gradation in decreasing the gradation in a part where the frequency distribution of pixel values is low.

In other words, as shown in FIG. 21, in the processing of the histogram equalization, the cumulative frequency distribution C(L) is detected by the arithmetic processing according to the equation shown below based on the frequency distribution H(L), the total of the number of pixels decided on the basis of the pixel value L in the input image.

$$C(L) = \sum_{k=0}^{L} H(k) \quad (1)$$

In the histogram equalization processing, the level conversion function T(L) is defined by regularizing the thus detected cumulative frequency distribution C(L) by the processing according to the equation shown below, and the signal level of the input image is corrected according to the level conversion function T(L). In the equation, Fmax denotes the final value of the cumulative frequency distribution C(L), and Lmax denotes the maximum value of the input/output level.

$$T(L) = \frac{C(L)}{F\max} \times L\max \quad (2)$$

The processing for correcting the gradation as mentioned above is executed as occasion demands, in a case where image data is transmitted through a transmission line, in a case where the data is to be displayed in a display device, or in a case where the data is to be stored in a storage device, for example, for the purpose of dynamic range oppression.

SUMMARY OF THE INVENTION

In a conventional gradation correction processing as mentioned above, the whole gradation is corrected at the sacrifice of contrast in a part or the other, in any method, it occurs because the level conversion is performed by an input/output function having monotonically increasing characteristics in order to avoid the generation of an unnatural image.

Therefore, in the conventional methods, there has been a problem of partial degradation in contrast in a processed image.

The present invention was invented in consideration of the above mentioned points, and the object of the invention is to offer an image processing device and an image processing method which are able to correct gradation in effectively avoiding the degradation in the partial contrast.

In order to solve the problem as mentioned above, in the image processing device and image processing method according to the present invention, the area to which image data belong is judged and the judgement result is output, and based on the judgement result, the correction coefficient for correcting the pixel values of the image data is generated and output. The pixel values of the image data is corrected according to the correction coefficient. In this case, with the approach to an edge formed by the image data, the resolution of the judgement result is increased.

In the image processing apparatus or the image processing method, an area to which the image data belong is judged and the judgement result is output, and based on the judgement result, the correction coefficient for correcting the pixel values of the image data is generated and output, and the pixel values of the image data is corrected by the correction coefficient. In this case, the correction coefficient is so generated that with the approach to an edge of an image formed by the above-mentioned image data, the resolution of the judgement result corresponding to the correction coefficient is increased.

An area to which the image data belong is judged and the judgement result is output, and based on the judgement result, the correction coefficient for correcting the pixel values of the image data is generated and output. When the pixel values of the image data is corrected according to the correction coefficient in the same area, pixel values are corrected by the same coefficient and the value relationship of pixels is held unchanged, and concerning the pixels existing in the different areas it is also possible even to reverse the value relationship of pixels. Thereby, the gradation as a whole can be corrected in avoiding the degradation in partial contrast.

In this case, by such an arrangement as to increase the resolution of a judgement result with the approach to an edge, and keeping enough correction coefficient in a part being apart from the edge, the change in the correction coefficient with the approach to the edge can be prevented; thereby, it is made possible to prevent an excessive emphasis of an outline.

In place of this, it is also possible to prevent an excessive emphasis of an outline by generating a correction coefficient so that the resolution of the correction coefficient is increased with the approach to an edge.

As mentioned above, according to the present invention, when the pixel values are corrected by generating a correction coefficient based on the judgement result in an area to which the input data belong, the resolution of the judgement result is controlled directly or indirectly to increase with the approach to an edge. Thereby, it is made possible to correct the gradation in effectively avoiding the degradation in partial contrast, which makes it possible to avoid an excessive emphasis of an outline.

BRIEF DESCRIPTION OF THE DRAWINGS

FIG. 9 shows a block diagram showing the dark-area-signal generation circuit in the gradation correction circuit shown in FIG. 1;

FIG. 11 shows a signal waveform chart for the explanation of the processing for the gradation correction circuit in the television camera shown in FIG. 2;

FIG. 16 shows a block diagram showing the gradation correction circuit to be applied to a television camera concerning a second embodiment according to the present invention;

FIG. 18 shows a characteristic curve chart to be used for the explanation of a level conversion function to be applied to the gradation correction circuit concerning another embodiment;

FIG. 19 shows a characteristic curve chart to be used for the explanation of a level conversion function to be applied to an oppression processing of a conventional gradation correction;

FIG. 20 shows a characteristic curve chart to be used for the explanation of the level conversion function to be applied to the gradation correction processing concerning another example different from that shown in FIG. 19.

DETAILED DESCRIPTION OF THE PREFERRED EMBODIMENTS

Figure 1:
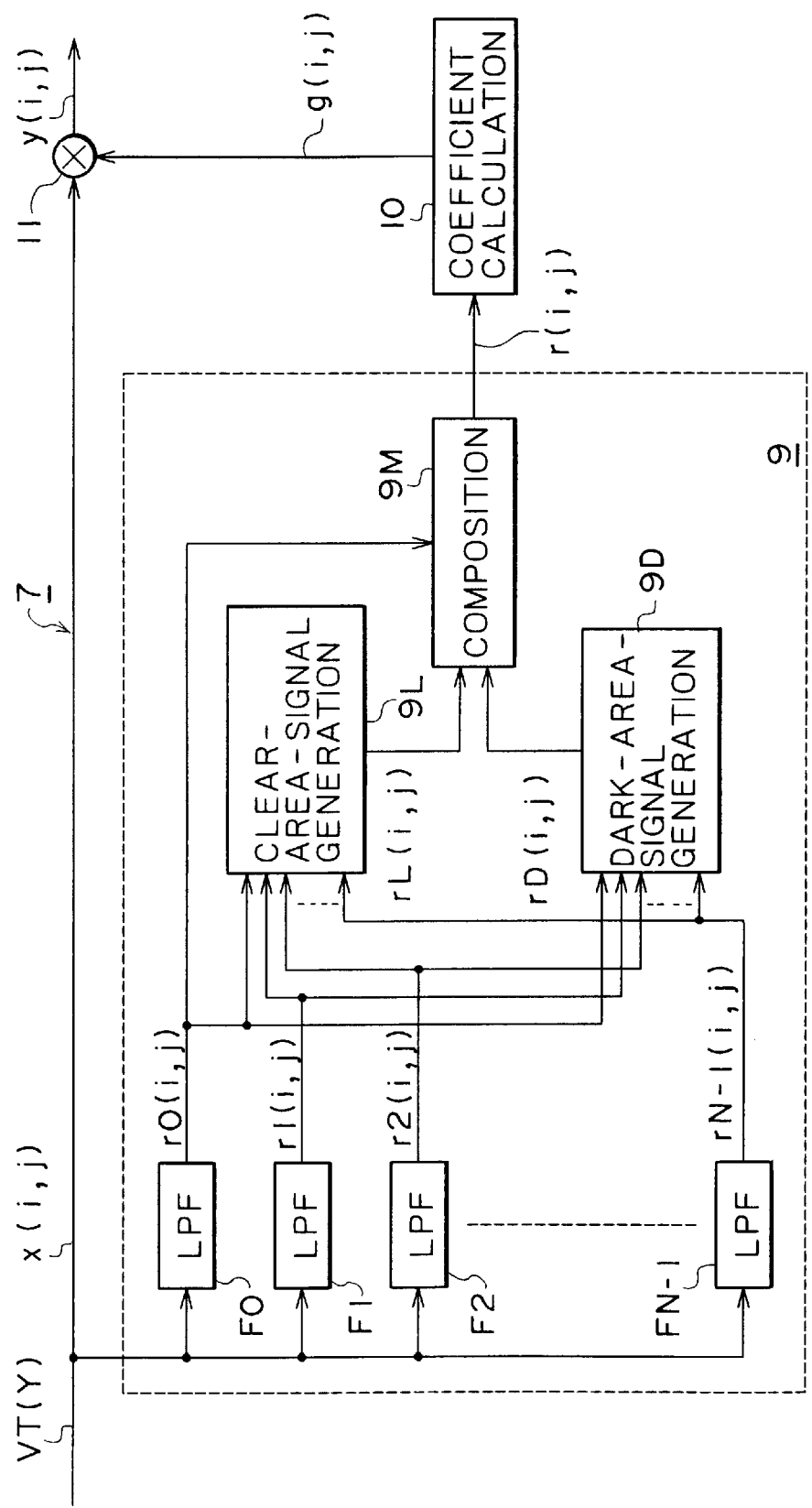
FIG. 1 shows a block diagram showing the gradation correction circuit to be applied to a television camera concerning a first embodiment according to the present invention.

In the following preferred embodiments according to the present invention will be explained in detail referring to the drawings.

(1) A First Embodiment
(1-1) The Configuration of the First Embodiment

Figure 2:
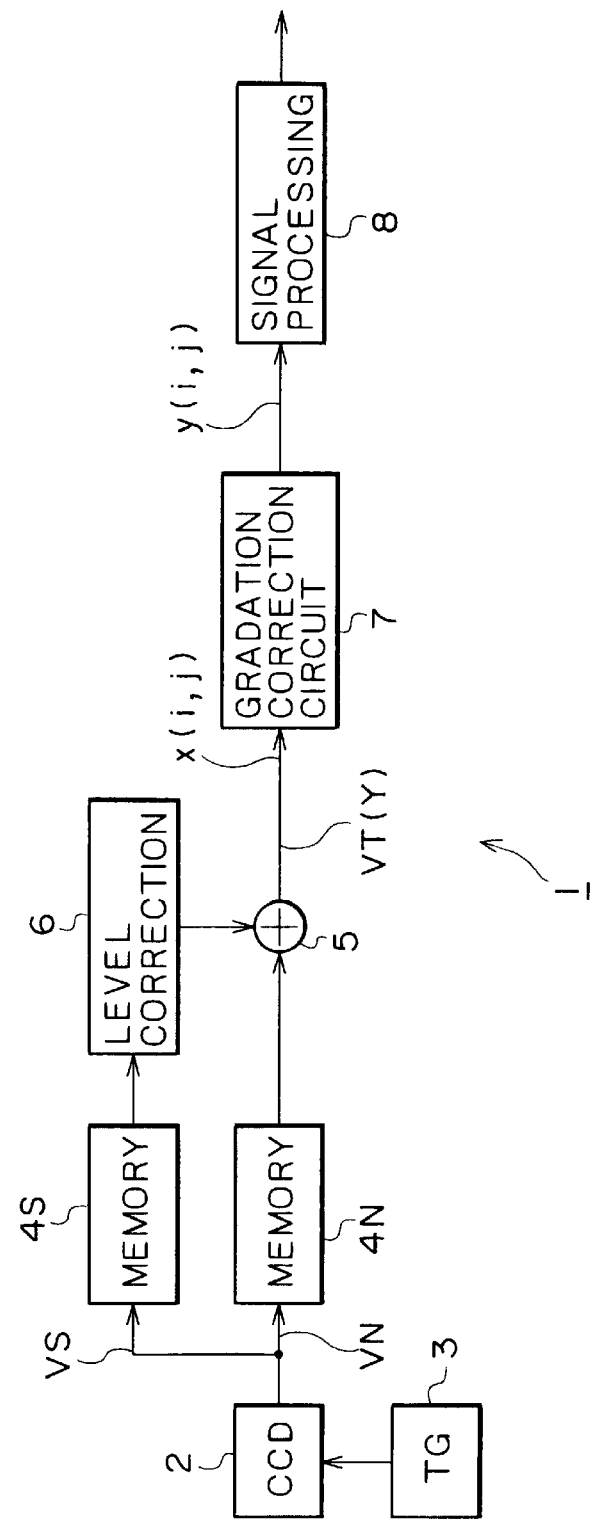
FIG. 2 shows a block diagram showing a television camera concerning the first embodiment.

FIG. 2 is a block diagram showing a television camera concerning the first embodiment according to the present invention. In the television camera 1, a CCD solid-state image pickup device 2 outputs a picked up image driven by a timing generator (TG) 3.

Figures 3, 4:
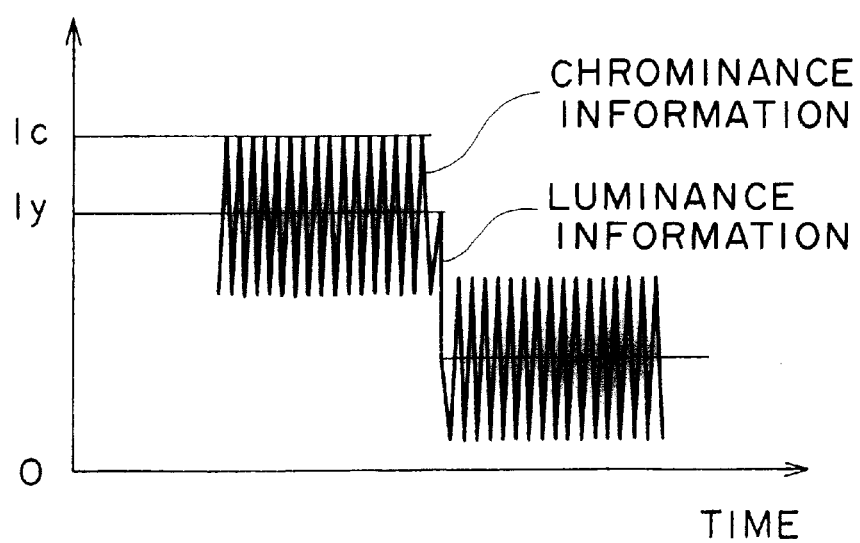
FIG. 3 shows a front view of a chrominance filter for a solid-state image pickup device to be applied to the television camera shown in FIG. 2.
FIG. 4 shows a signal waveform chart showing an image pickup result using the chrominance filter shown in FIG. 3.

As shown in an enlarged front view showing an image pickup surface shown in FIG. 3, in the CCD solid-state image pickup device, a chrominance filter of additive complementary colors having a diced pattern is provided on the image pickup surface. In other words, in the CCD solid-state image pickup device 2, lines of odd numbers are formed by the repetition of alternation of yellow (Ye) and cyan (Cy) by the pixel unit and lines of even numbers are formed by the repetition of alternation of magenta (Mg) and green (G) by the pixel unit.

Thereby, in the CCD solid-state image pickup device 2, the image pickup results which are formed by superposing a chrominance signal, being amplitude-modulated, on a luminance signal in order by time division system are output from a correlation double sampling circuit which is usually accompanied to this kind of image pickup device as shown in FIG. 4.

When such image pickup results are output, the CCD solid-state image pickup device 2 is able to obtain image pickup results in a period of 1/60 second according to a charge accumulation time set by a user, and the image pickup results are output as image pickup results VN of normal exposure. Further, the CCD solid-state image pickup device 2, in a vertical blanking period of an image pickup result VN of normal exposure, obtains an image pickup result in a shorter charge accumulation time in comparison with that obtained by normal exposure, and outputs the image pickup results as image pickup results VS of a short time exposure.

Figure 5A:
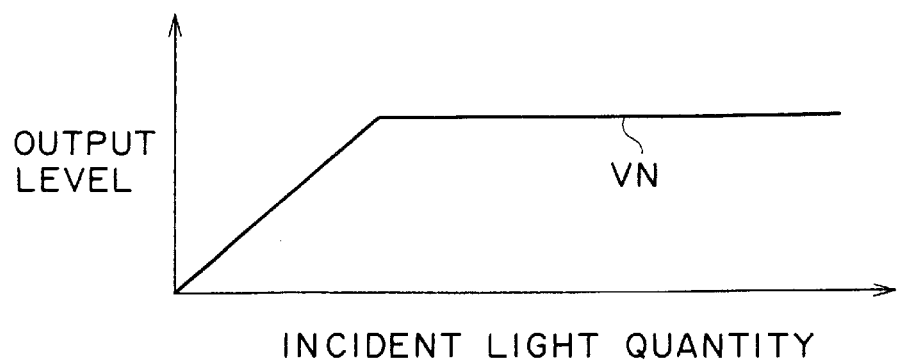
FIG. 5 shows a characteristic curve chart to be used for the explanation of the processing for an image pickup result taken by the camera shown in FIG. 2.
Figure 5B:
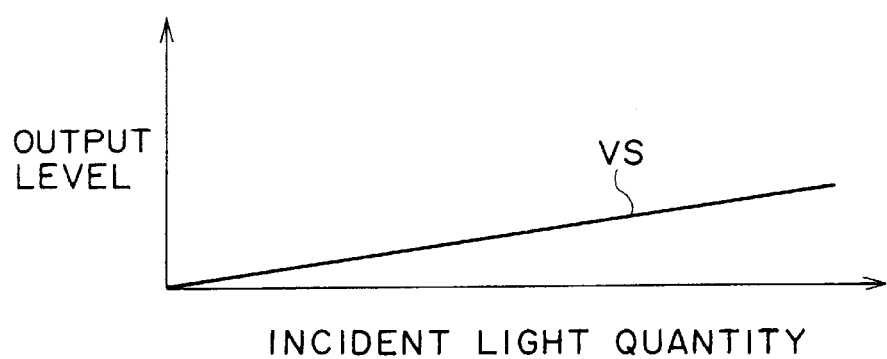

As shown in FIG. 5, the CCD solid-state image pickup device 2 outputs an image pickup result VN of normal exposure being saturated in a case where the light quantity is larger than a predetermined value as shown in FIG. 5(A), and an image pickup result VS of a short time exposure not being saturated due to a shorter charge accumulation time than that in the above case, and the VS which forms one set with the VN as shown in FIG. 5(B).

A memory 4N inputs the image pickup results VN of normal exposure through a correlation double sampling circuit, a defect correction circuit, an analog/digital conversion circuit, etc. (not shown in drawings) and holds the image pickup results VN of normal exposure temporarily and outputs them.

In the same manner, a memory 4S inputs the image pickup results VS of short time exposure through the correlation double sampling circuit, the defect correction circuit, the analog/digital conversion circuit, etc. (not shown in drawings) and holds the image pickup results VS of a short time exposure temporarily and outputs them.

An addition circuit 5 adds the image pickup result VN of normal exposure held in the memory 4N and the image pickup result VS of short time exposure held in the memory 4S, and obtains and outputs an image pickup result VT having an enough pixel value and a wide dynamic range. A level correction circuit 6 corrects and outputs the pixel value of the image pickup result VS of a short time exposure output from the memory 4S in order to secure linearity being good enough for practical use in the image pickup result VT generated in the addition circuit 5.

Figure 5C:
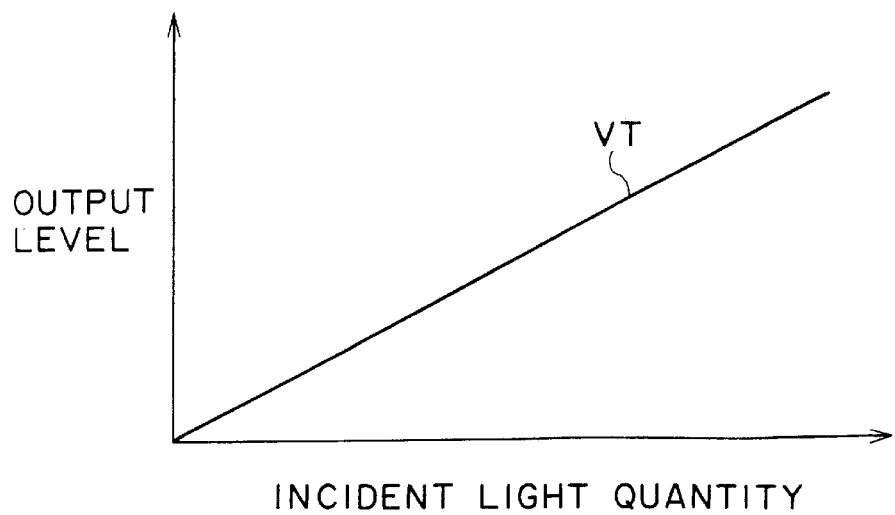

Thereby, it is made possible to generate an image pickup result VT (FIG. 5(C)) having a larger dynamic range in comparison with the conventional ones with the television camera 1.

A gradation correction circuit 7 corrects and outputs the gradation of the image pickup result VT by correcting the pixel values of the image pickup result VT. The television camera 1 outputs an image pickup result in executing every necessary signal processing with the signal processing circuit 8 in the succeeding stage to the gradation correction circuit 7 to external equipment etc. In this case, in order to correspond to output equipment the dynamic range of the image pickup result is oppressed by oppressing the pixel values of the image pickup result in a uniform rate.

In other words, as shown in FIG. 1, in the gradation correction circuit 7, an area-judgement-filter 9 judges an area to which the input image data belong, and outputs the judgement result, r (i, j). In this case, the area-judgement-filter 9 judges the area to which the input image data belong according to the trait quantity showing the trait of the predetermined range in the vicinity of respective input image data. In this case, the average luminance level of the input image data is used as the trait quantity.

The area judgement filter 9 judges that the input image data belongs to which average luminance level area, and outputs the judgement result r (i, j) according to the average luminance level, a low frequency component of the input image data. In this case, the area judgement filter 9 generates the judgement result r (i, j) in such a manner that the resolution is increased with the approach to an edge.

Figure 6:
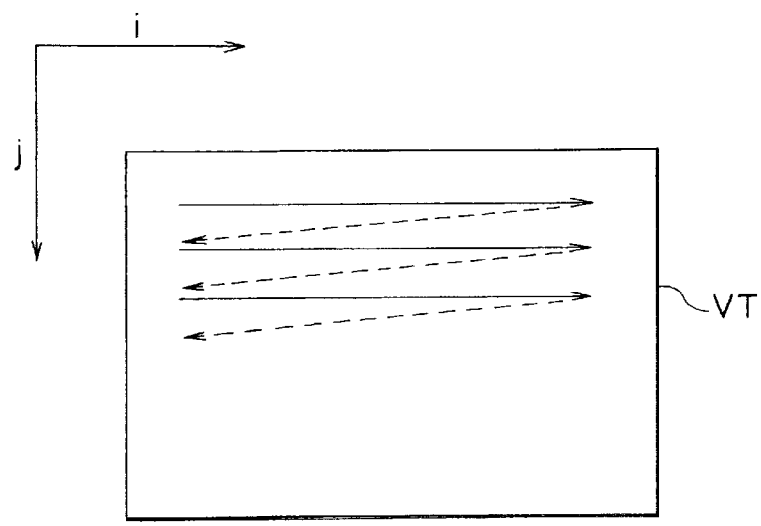
FIG. 6 shows a schematic diagram showing the disposition of pixels in the television camera shown in FIG. 2.

In the area judgement filter 9, low pass filters F0, F1, F2, . . . FN-1 are constituted with 2 dimensional low pass filters having different band width from each other, and by executing the arithmetic processing shown in the following equation, the areas to which the input image data belong are judged by means of the resolutions corresponding to respective pass bands, and the judgement result r0 (i, j), r1 (i, j), r2 (i, j), . . . , rN-1 (i, j) is output.

$$r(i, j) = \sum_{dj=-N/2}^{N/2} \sum_{di=-M/2}^{M/2} \frac{x(i + di, j + dj)}{M \times N} \tag{3}$$

where, N and M in the equation (3) express the constants denoting the magnitudes in the vicinity area for calculating the average values. In this embodiment, as shown in FIG. 6, in the image pickup results VT which are input in the scanning order on the raster, the lines having the symbol i denote horizontal lines and the lines having the symbol j denote vertical lines.

The low-pass filters F0, F1, F2 . . . FN-1 are so set that the values of M and N in equation (3) decrease successively. Thereby, the area-judgement-filter 9 judges that in which area of average luminance level the input image data exist by different resolutions, and the result of judgement r0 (i, j), r1 (i, j), r2 (i, j), . . . , rN-1 (i, j) is obtained.

A clear-area-signal generation circuit 9L, on the clear area side where the luminance level is high generates and outputs the judgement result rL (i, j) on the clear area side which makes the resolution of the image pickup result increase with the approach to an edge based on the judgement result r0 (i, j), r1 (i, j), r2 (i, j), . . . , rN-1 (i, j).

Figure 7:
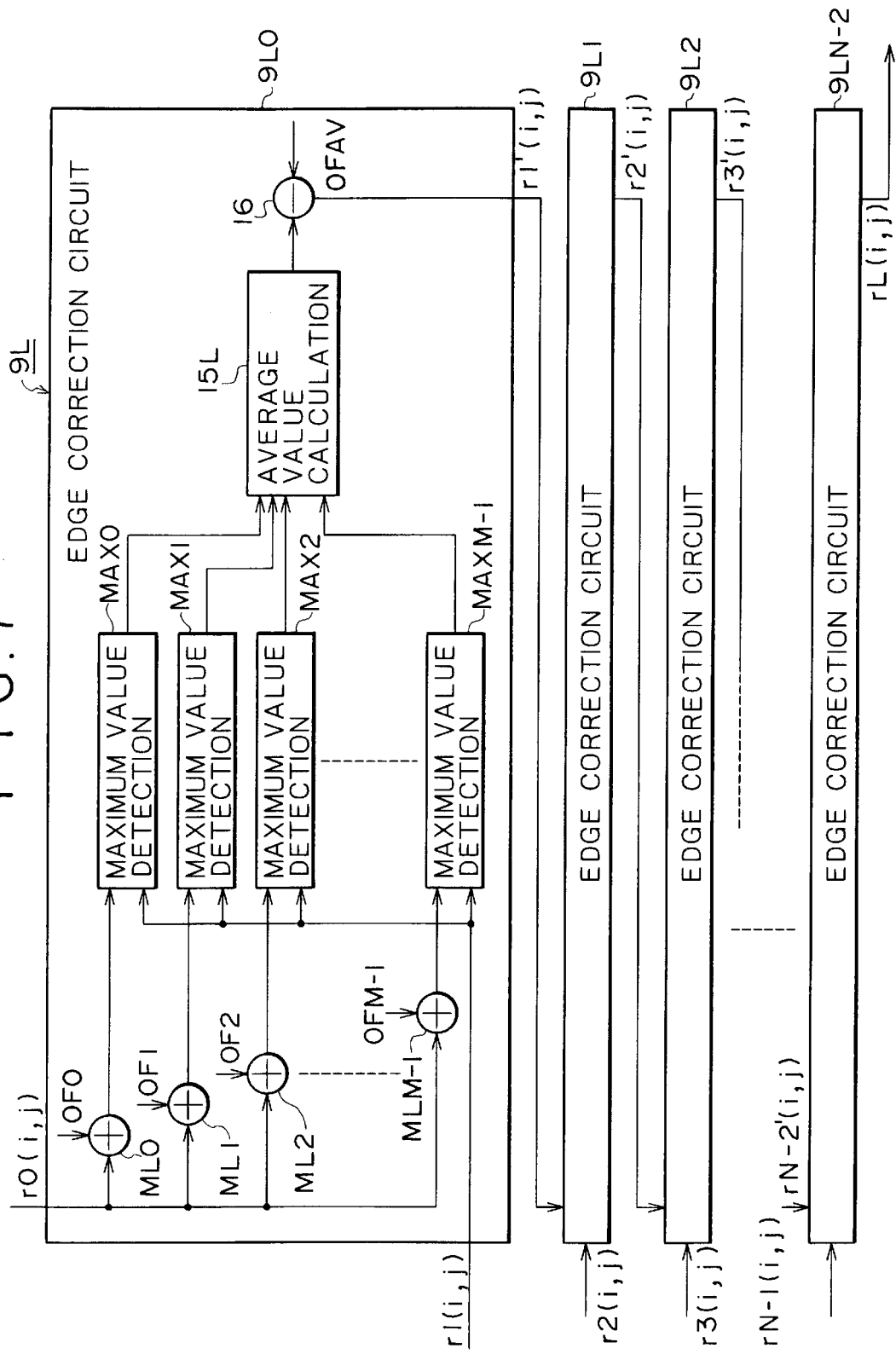
FIG. 7 shows a block diagram showing a clear-area-signal generation circuit in the gradation correction circuit shown in FIG. 1.

As shown in FIG. 7, the clear-area-signal generation circuit 9L is constituted by the edge correction circuits, 9L0, 9L1, 9L2, . . . , 9LN-2, connected in cascade being constituted with a smaller number of terms than those of the judgement result r0 (i, j), r1 (i, j), r2 (i, j), . . . , rN-1 (i, j). The clear-area-signal generation circuit 9L inputs the judgement result r0 (i, j) of the lowest resolution and the r1 (i, j) of the second lowest resolution to the first edge correction circuit 9L0 in the heading stage. Further, the clear-area-signal generation circuit 9L inputs judgement results, r2 (i, j), r3 (i, j), . . . , rN-1 (i, j) in which resolutions increase in order and respective output signals, r0' (i, j), r1' (i, j), r2' (i, j), . . . , rN-2' (i, j) of the correction circuits output from respective preceding stages to the following edge correction circuits 9L1, 9L2, . . . 9LN-2, and outputs a signal obtained from the last edge correction circuit 9LN-2 as a clear-area-side judgement result rL (i, j).

In the clear-area-signal generation circuit 9L, one judgement result rL (i, j) is composed of the judgement results r0 (i, j), r1 (i, j), r2 (i, j), . . . , rN-1 (i, j) in the order starting from the low resolution side, and the judgement result rL (i, j) is output.

Figure 8A:
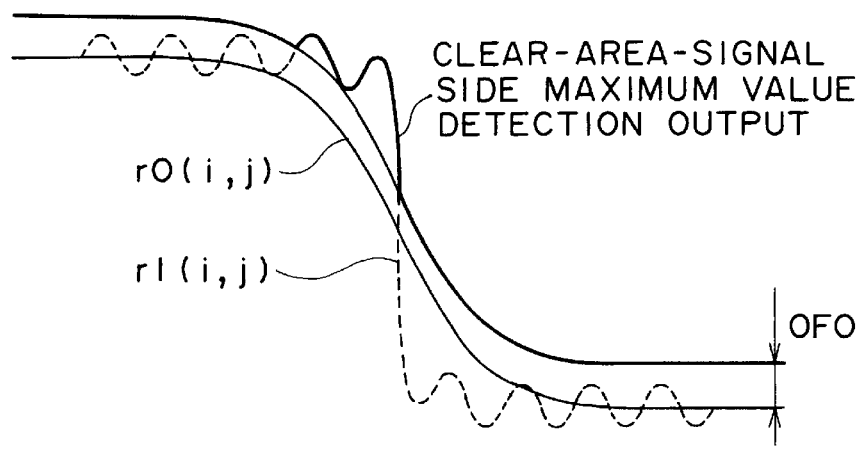
FIG. 8 shows a signal waveform chart to be used for the explanation of the processing for the clear-area-signal generation circuit shown in FIG. 7.

The edge correction circuits, 9L0, 9L1, 9L2, . . . , 9LN-2 have the same constitution excepting the point that the input signals are different from each other. The first edge correction circuit 9L0 supplies a judgement signal r0 (i, j) on the low resolution side to the addition circuits ML0, ML1, ML2, . . . , MLM-1 and as shown in FIG. 8(A), and offset values, OF0, OF1, OF2, . . . , OFM-1 being different from each other are added. In FIG. 8(A), the waveforms of input and output signals are shown concerning the addition circuit ML0.

The maximum value detection circuits MAX0, MAX1, MAX2, . . . , MAXM-1 input the output signals of addition circuits ML0, ML1, ML2, ..., MLM-1 respectively and the judgement result r1 (i, j) on the high resolution side, and select signals having larger values than those of these two signals in order and output them. Thereby, the maximum value detection circuits, MAX0, MAX1, MAX2, ..., MAXM-1, make a high resolution signal not appear in the area where the level change is small, and on the high level side, make the resolution increase with the approach to an edge and output respectively the maximum detection results.

An average value calculation circuit 15L levels the values of the outputs from the maximum value detection circuits MAX0, MAX1, MAX2, ..., MAXM-1 and outputs the leveled values in order to prevent the occurrence of small fluctuations of judgement results due to high resolution, to lighten the influence of the discontinuity of the differential coefficient caused by a maximum value detection processing, and to increase the resolution with the approach to an edge.

A subtraction circuit 16 subtracts the average value of offset values OF0, OF1, OF2, ..., OFM-1 given in the addition circuits ML0 to MLM-1 from the output signal of the average value calculation circuit 15L; thereby, the output signal from the average value calculation circuit 15L is corrected by the offset value given in the addition circuits, ML0 to MLM-1, and it is output to the succeeding edge correction circuit.

The clear-area-signal generation circuit 9L outputs one judgement result rL (i, j) being composed of judgement results r0 (i, j), r1 (i, j), r2 (i, j), ..., rN-1 (i, j) starting from the judgement result on the low resolution side in order, in processing the judgement results r0 (i, j), r1 (i, j), r2 (i, j), ..., rN-1 (i, j) with respective edge correction circuits 9L0, 9L1, 9L2, ..., 9LN-2 in order.

In contrast to the above, the dark-area-signal generation circuit 9D, in the similar way to the above, on the dark area side where luminance level is low, generates the one judgement result on the dark area side rD (i, j) in which resolution is increased with the approach to an edge in an image pickup result.

In other words, as shown in FIG. 9, the dark-area-signal generation circuit 9D is constituted with edge correction circuits 9D0, 9D1, 9D2, ..., 9DN-2 being connected in cascade having a smaller number of terms than that of the judgement results r0 (i, j), r1 (i, j), r2 (i, j), ..., rN-1 (i, j) by one term. The dark-area-signal generation circuit 9D inputs the judgement result r0 (i, j) of the lowest resolution and the judgement result r1 (i, j) of the second lowest resolution to the first edge correction circuit 9D0, a heading stage. Further, a dark-area-signal generation circuit 9D inputs the judgement results, r2 (i, j), r3 (i, j), ..., rN-1 (i, j), in which resolution is increased in order, and the output signals, r0' (i, j), r1' (i, j), r2' (i, j), ..., rN-2' (i, j) of respective edge correction circuits in the preceding stages, 9D0, 9D1, 9D2, ..., to the following edge correction circuits, 9D1, 9D2, ..., 9DN-2, and the output signal obtained from the last edge correction circuit 9DN-2 is output as a judgement result rD (i, j) on the dark-area side.

Figure 8B:
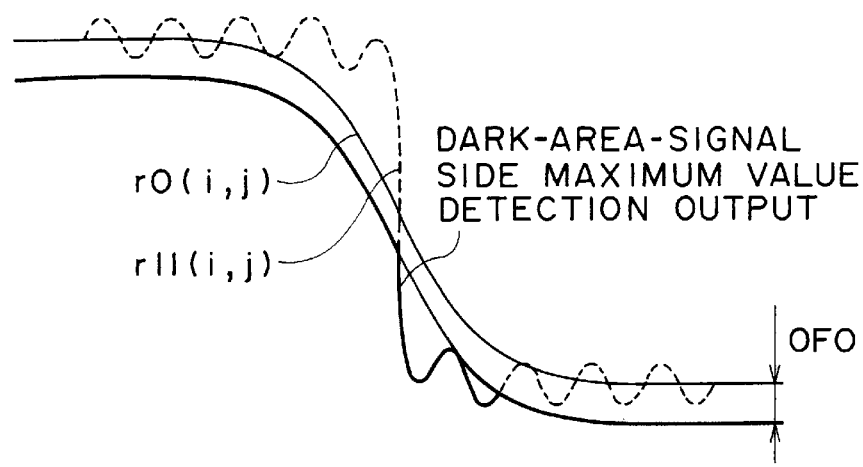

The edge correction circuits, 9D0, 9D1, 9D2, ..., 9DN-2 are constituted identically excepting the point that the input signals are different from each other. The first edge correction circuit 9D0 supplies the judgement signal r0 (i, j) on the low resolution side to the subtraction circuits, ND0, ND1, ND2, ..., NDM-1, and as shown in FIG. 8(B), subtracts offset values, OF0, OF1, OF2, ... OFM-1 having different values from each other. In FIG. 8(B), the signal waveforms of input/output signals concerning the subtraction circuit ND0 are shown.

Minimum value detection circuits MIN0, MIN1, MIN2, ... MINM-1 input the output signals of respective subtraction circuits, ND0, ND1, ND2, ..., NDM-1, and a judgement result r0 (i, j) being on the low resolution side, and select and output signals having smaller values than those of these two input signals in order. Thereby, the minimum value detection circuits MIN0, MIN1, MIN2, ..., MINM-1, make high resolution signals not appear in the area where level change is small, and on a low level side, make resolution increase with the approach to an edge and output respectively the maximum value detection results.

An average value calculation circuit 15D levels the output signal values of these minimum value detection circuits, MIN0, MIN1, MIN2, ..., MINM-1, in order to smooth out small fluctuations of judgement results due to high resolution and to lighten the influence of discontinuity of differential coefficients caused by the minimum value detection processing; and the leveled result is output to make the resolution increase with the approach to an edge on the low level side.

The addition circuit 17 adds the average value of offset values OF0, OF1, OF2, ..., OFM-1 given in the subtraction circuits MD0 to MDM-1 to the output signal of the average value calculation circuit 15D; thereby, the output signal of the average value calculation circuit 15D is corrected by the offset value given in the subtraction circuits, MD0 to MDM-1, and output to the succeeding edge correction circuit.

The dark-area-signal generation circuit 9D outputs one judgement result rD (i, j) being composed of judgement results, r0 (i, j), r1 (i, j), r2 (i, j), ..., rN-1 (i, j) in the order starting from the judgement results on the low resolution side in processing the judgement results, r0 (i, j), r1 (i, j), r2 (i, j), ..., rN-1 (i, j) with respective edge correction circuits, 9D0, 9D1, 9D2, ..., 9DN-2, in order.

A composition circuit 9M (FIG. 1) outputs a comprehensive judgement result r (i, j) by selectively outputting a judgement result rL (i, j) on the clear-area-side and a judgement result rD (i, j) on the dark-area-side on the basis of the judgement result r0 (i, j), the output of a low-pass filter of the lowest resolution.

Figure 8C:
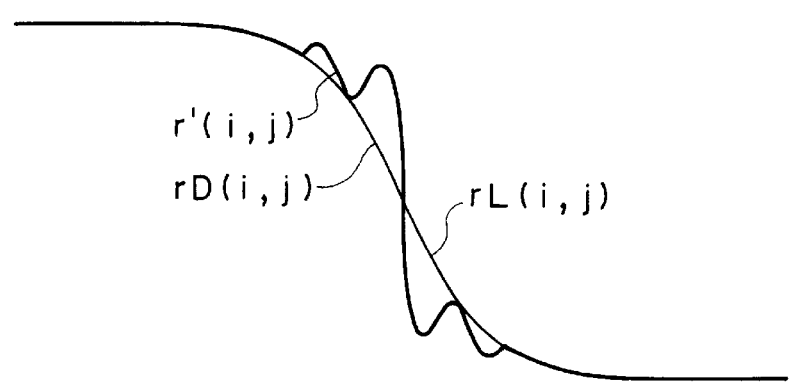

In other words, the composition circuit 9M (FIG. 1) processes the judgement result rL (i, j) on the clear area side and the judgement result rD (i, j) on the dark area side on the basis of the judgement result r0 (i, j) by an arithmetic processing according to the following equation; thereby, the judgement result rL (i, j) or rD (i, j) having a large difference in the absolute value from the judgement result r0 (i, j) is selected in order and output. In FIG. 8(C), the composition processing is shown taking the addition circuit ML0 and the subtraction circuit NL0 as an example.

$$r(i, j) = rL(i, j) \quad (4)$$
$$\ldots |rL(i, j) - r0(i, j)|$$
$$\geq |rD(i, j) - r0(i, j)|$$
$$r(i, j) = rD(i, j)$$
$$\ldots |rL(i, j) - r0(i, j)|$$
$$< |rD(i, j) - r0(i, j)|$$

Figure 10:
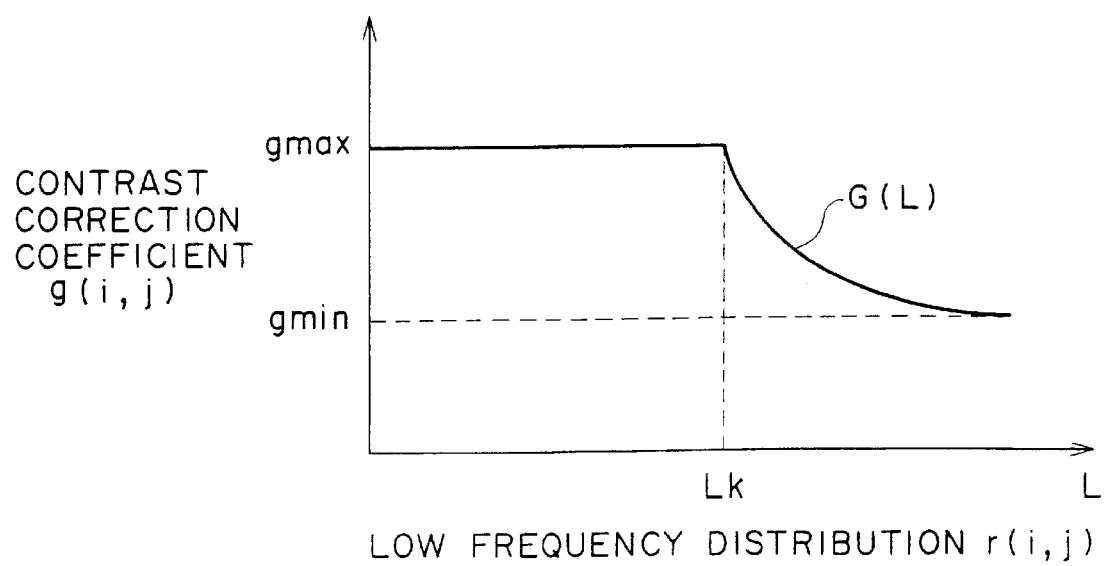
FIG. 10 shows a characteristic curve chart to be used for the explanation of the contrast correction coefficient g (i, j)

A coefficient calculation circuit 10 generates a contrast correction coefficient g (i, j), for example, with the coefficient calculation function G as shown in FIG. 10 corresponding to the signal level of the judgement result r (i, j). The coefficient calculation function G can be obtained, for example, by the arithmetic processing of the level conversion function T(L), described in the preceding pages concerning FIG. 19, according to the following equation.

$$G(L) = \frac{T(L)}{L} \quad (5)$$

Thereby, the coefficient calculation circuit 10 generates the contrast correction coefficient g (i, j) by the arithmetic processing according to the following equation and outputs it, and about an area where the signal level of the low frequency component r (i, j) being an input level is lower than the predetermined reference level lk, it outputs the contrast correction coefficient g (i, j) by a constant gmax being larger than 1, and about an area where the signal level is higher than lk, it outputs a contrast correction coefficient g (i, j) to make its value approach to a value gmin gradually corresponding to the signal level of the low frequency component r (i, j).

$$g(i,j)=G(r(i,j)) \quad (6)$$

A multiplication circuit 11 multiplies the pixel value x (i, j) of the image pickup result VT by the contrast correction coefficient g (i, j) generated as mentioned above; thereby, the signal level of the image pickup result VT is corrected with the contrast correction coefficient g (i, j), and the result is output.

(1-2) The Operation in the First Embodiment

In the above configuration, an image pickup result is output (FIG. 4) from the television camera 1 (FIG. 2) in which a chrominance signal output from the CCD solid-state image pickup device 2, being amplitude-modulated with a chrominance filter disposed on the image pickup surface, is superposed upon a luminance signal according to a time division system.

From the television camera 1, an image pickup result VN (FIG. 5(A)) of normal exposure corresponding to the charge accumulation time set by a user and another image pickup result VS (FIG. 5(B)) of a short time exposure corresponding to a short charge accumulation time are alternately output, and these image pickup results VN and VS are respectively stored by a memory 4N and 4S. In the television camera 1, these two image pickup results VN and VS compose one picture using the level correction circuit 6 and the addition circuit 5; thereby the image pickup result VT (FIG. 5(C)) having far larger dynamic range in comparison with conventional ones is generated.

The image pickup result VT, after its gradation is corrected by the gradation correction circuit 7, is given every necessary processing to a television camera by the signal process circuit 8 and output by a proper dynamic range corresponding to external equipment.

In the gradation circuit 7, concerning the image pickup result VT, the area-judgement-filter 9 judges an area to which the input image data belong according to the trait quantity showing the trait of a predetermined range in the vicinity of the input image data, and the judgement result r (i, j) is output as an average luminance level. Further the judgement result r (i, j) is generated in such a manner that the resolution is increased in the vicinity of an edge.

In other words, concerning the image pickup result VT, in the area-judgement-filter 9 the low frequency component r (i, j), showing an average luminance level, an average of the pixel values x (i, j), is detected; thereby detailed structures in the image are removed and an area wherein pixel values are comparatively even is extracted. Further, the low frequency component r (i, j) is generated in such a manner that detailed structures are increased with the approach to an edge.

In the image pickup result VT, the contrast correction coefficient g (i, j) is generated corresponding to the signal level of the low frequency component r (i, j) by the succeeding coefficient calculation circuit 10, and the pixel values in the image pickup result are corrected by the contrast correction coefficient g (i, j) in the multiplication circuit 11.

Thereby, in the image pickup result VT, in the areas where the signal levels of low frequency components r (i, j) are equal, pixel values are corrected with the same gain. While in the areas where the signal levels are different from each other, pixel values can be made close corresponding to the setting of the level conversion function T (1), and in certain circumstances it is also possible to reverse the magnitude relationship between pixels. Thereby, the contrast in respective areas can be naturally increased for the gradation in the whole area and further it is made possible to correct the gradation of the whole area in effectively avoiding the lowering of the partial contrast.

In other words, as shown in FIG. 11, in a case, where the pixel values x (i, j) fluctuate at a frequency higher than the cutoff frequency of the area-judgement-filter 9 and further the DC component level rises up sharply (FIG. 11(B)), and when the change of the low frequency component r (i, j) which corresponds to the sudden change of the DC component level goes over the inflection point of the coefficient-calculation-function G(L) (FIG. 11(A)), in the case of a conventional level conversion function described in FIG. 11(A), in the correction result Y (i, j), the contrast in an area where pixel values are large can be oppressed (FIG. 11(C)).

On the contrary, in the present embodiment, before or after the time when the signal level of the low frequency component r (i, j) rises up sharply, the pixel values y (i, j) are corrected by the gain corresponding to the signal level of the low frequency component r (i, j); therefore the signal level is corrected by the setting of the coefficient-calculation-function G(L). In this case, in the part where pixel values x (i, j) are small, the pixel values x (i, j) are corrected by the gain gmax at a an average value, for example, level 12, an average value of a peak value 13 and the bottom value 11; thereby, for the low level areas, the contrast in the same order as that obtained in a conventional method can be obtained (FIG. 11(D)).

In contrast to this, in a part where pixel values are high, in the similar way to the above, the pixel values x (i, j) are corrected by a gain g5 at an average, for example, 15, an average of a peak value 16 and a bottom value 14, in this case, since the pixel values at the peak value 16 and the bottom value 14 are corrected by a uniform gain, the contrast in the area having a level between the peak value 16 and the bottom value 14 is corrected by the gain g5.

Therefore, in the case of the gradation-correction-circuit 7 according to the present embodiment, when a picture is seen as a whole, the gradation does not change largely, but about minute changes seen microscopically, it is possible to enlarge the fluctuations in an image pickup result VT being an input image.

Figure 12A:
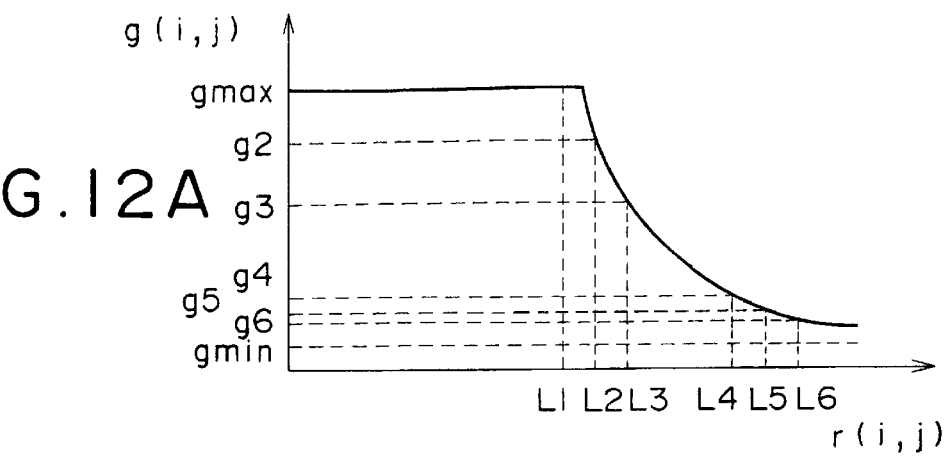
FIG. 12 shows a signal waveform chart to be used for the explanation of the gradation correction circuit in the case of a different input level from the case described in FIG. 11.
Figure 12B:
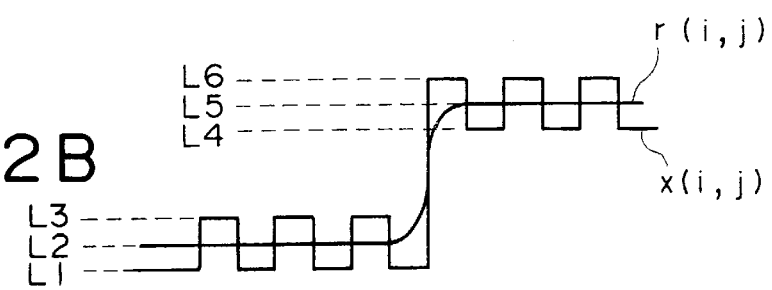
Figure 12C:
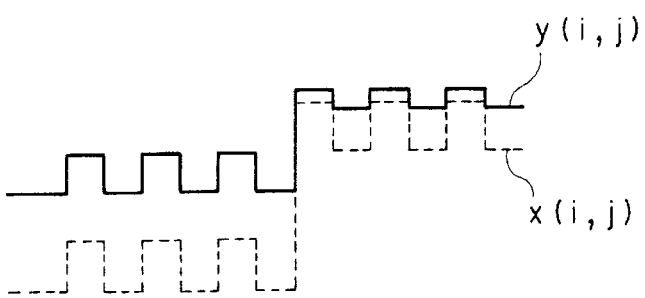

As shown in FIG. 12, in the similar way to the above, in a case where the pixel values x (i, j) fluctuate and the DC component level rises sharply and also in a case where a large change in the pixel value x (i, j) is deviated from the inflection point of the coefficient-calculation-function G(L) toward the high level side (FIG. 12(B)), in a case where a conventional level conversion function is used, described in the preceding pages concerning FIG. 19, the contrast about all pixel values x (i, j) is oppressed (FIG. 12(C)).

Figure 12D:
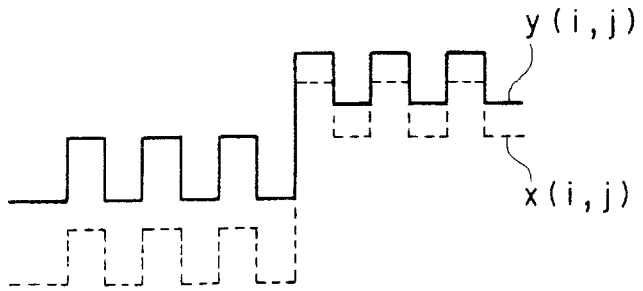

Even in such a case, according to the present embodiment, on both sides, the low level side and the high level side, the pixel values are corrected respectively by the gains g2 and g5 corresponding to the average values 12 and 15 and even though the gradation seen as a whole is not changed largely, when small changes are seen microscopically, it is made possible even to enlarge the small changes in the image pickup result VT being an input image signal (FIG. 12(D)).

When the gradation is corrected as mentioned above, in the area-judgement-filter 9, since the judgement result r (i, j) is so produced that the resolution is increased with the approach to an edge, an excessive emphasis can be avoided.

Figure 13A:
FIG. 13 shows a signal waveform chart to be used for the explanation of gradation correction in the vicinity of an edge in a case where the processing is performed by the judgement result of a high resolution.
Figure 13B:
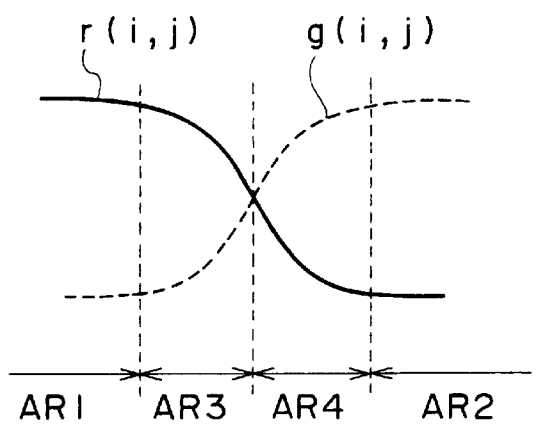
Figure 13C:
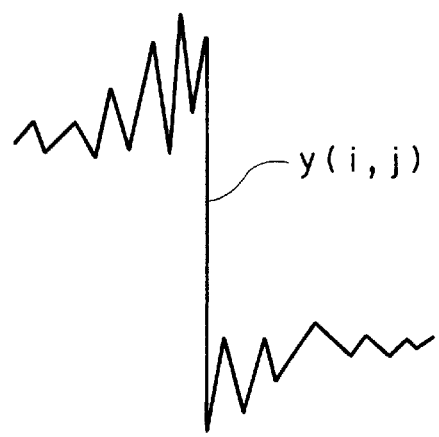

In other words, as shown in FIG. 13, in a case where the pixel values x (i, j) are sharply changed and an edge is formed (FIG. 13(A)), when the resolution of the low frequency component r (i, j) which produces correction coefficient g (i, j) as described in the above is low, that is, when such low frequency component r (i, j) is generated with a low-pass filter having a narrow pass band, the signal level of the low frequency component r (i, j) is changed smoothly in the vicinity of the edge (FIG. 13(B)). Corresponding to the above, the value of the correction coefficient g(i, j) is changed approximately complimentarily.

Thereby, in the areas, AR1 and AR2 being apart from an edge and the signal level of the low frequency component r (i, j) being approximately constant, since the respective correction coefficients g (i, j) are kept constant, the gradation is kept at a value decided by the correction coefficient g (i, j).

In contrast to this, in the area AR3 located in the vicinity of an edge where signal level is high, since the signal level of the low frequency component r (i, j) is low, the gradation is corrected by the correction coefficient g (i, j) which increases gradually, in comparison with the area AR1, and in this case signal levels are excessively raised up.

In the area AR4 located in the vicinity of an edge on the low level side, since the signal level of the low frequency component r (i, j) is not completely lowered, so that in comparison with the succeeding neighboring area AR 2, the gradation is corrected by the correction coefficient g (i, j) which decreases gradually, so that in this case, the signal level goes down excessively. Thereby, when the resolution of the low frequency component r (i, j) which generates the correction coefficient g (i, j) is low, an outline is excessively emphasized.

Figure 14A:
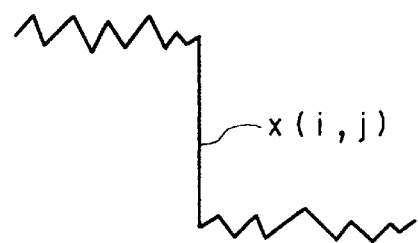
FIG. 14 shows a signal waveform chart to be used for the explanation of gradation correction in the vicinity of an edge in a case where the processing is performed by the judgement result of a low resolution.
Figure 14B:
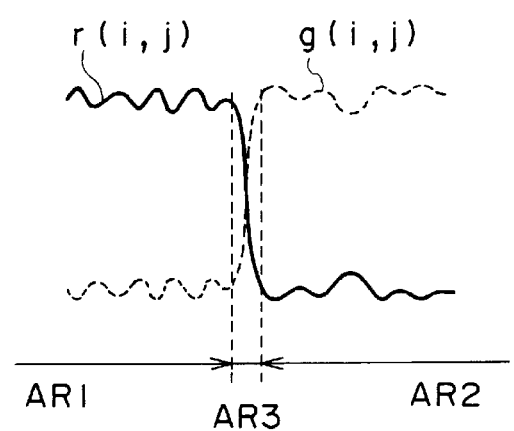

In contrast to this, as shown in FIG. 14, in a similar case to the above where pixel values x (i, j) are sharply changed and an edge is formed (FIG. 14(A)), when the low frequency component r (i, j) of this kind is formed with a low-pass filter having a wide pass band and of a high resolution, signal level is changed faithfully in the vicinity of an edge in comparison with the case where the low frequency component r (i, j) is formed with a low-pass filter, while in the area apart from an edge, the signal level varies corresponding to the pixel value (FIG. 13(B)).

Figure 14C:
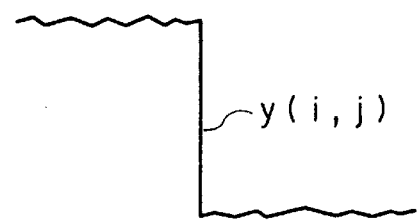

Therefore, in this case, in the area AR3 located in the vicinity of an edge, the edge can be expressed well; however, in the areas, AR1 and AR2, being apart from an edge contrast is lowered (FIG. 14(C)).

Figure 15A:
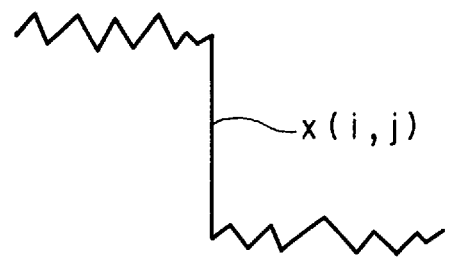
FIG. 15 shows a signal waveform chart to be used for the explanation of the processing in the vicinity of an edge in the gradation correction circuit shown in FIG. 1.
Figure 15B:
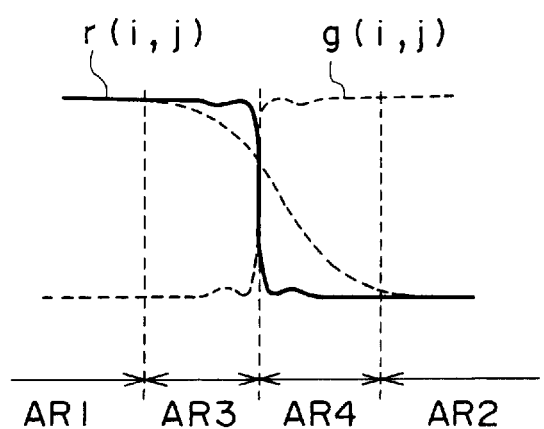
Figure 15C:
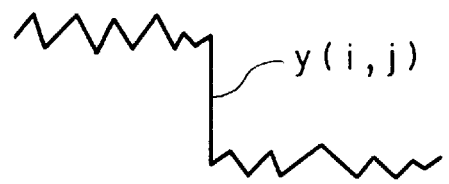

In contrast to this, as shown in FIG. 15, in the present embodiment, since the judgement result r (i, j) is generated in such a manner that the resolution is increased with the approach to an edge, excessive emphasis of an edge can be effectively avoided and it is made possible to obtain enough contrast.

In other words, concerning the image pickup result VT (FIG. 1), in the plurality of low-pass filters, F0 to FN-1 having different pass bands from each other disposed in the gradation correction circuit 9, the low frequency components r0 (i, j) to rN-1 (i, j), area judgement results, are generated in different resolutions. Further, in the clear-area-signal generation circuit 9L and the dark-area-signal generation circuit 9D, the low frequency components r0 (i, j) to rN-1 (i, j) having different resolutions are composed and they take charge of the high luminance level side and the low luminance level side from the edge respectively and the judgement result rL (i, j) on the clear area side and the judgement result rD (i, j) are generated in which resolutions are increased with the approach to an edge.

Further, concerning the image pickup result VT, in the succeeding composition circuit 9M, a comprehensive judgement result r (i, j) is composed of the judgement result on the clear area side rL (i, j) and the judgement result on the dark area side rD (i, j) and the comprehensive judgement result r (i, j) is output to the coefficient calculation circuit 10, and a correction coefficient g (i, j) is generated. Thereby, enough contrast is secured in effectively avoiding excessive emphasis of edges, and it is made possible to correct the whole gradation in effectively avoiding the lowering of partial contrast.

Thus, when the comprehensive judgement result r (i, j) is composed, the image pickup result VT, in the edge correction circuits 9L0 to 9LN-2 of the clear-area-signal generation circuit 9L (FIG. 7) detects the maximum value of the judgement results r0 (i, j), r1 (i, j), r2 (i, j), . . . , rN-1 (i, j) starting from the low resolution side in order, and composes the judgement results rL (i, j) on the clear area side.

In the edge correction circuits 9D0 to 9DN-2 of the dark-area-signal generation circuit 9D (FIG. 9), in the similar way to the above, the image pickup result VT detects the minimum value in the judgement results r0 (i, j), r1 (i, j), r2 (i, j), . . . , rN-1 (i, j) starting from the low resolution side in order and composes the judgement results rD (i, j) on the dark area side. Thereby, the image pickup result VT generates the judgement result on the clear area side and the judgement result on the dark area side in such a manner that the resolutions are increased smoothly with the approach to edges respectively. Thereby, the image pickup results are so arranged as to be able to effectively avoid a sudden change in resolution in the judgement result r (i, j) and to prevent the deterioration in the picture quality accompanied to the sudden change in resolution in the judgement result r (i, j).

In this case, in the respective edge correction circuits 9L0 to 9LN-2 and 9D0 to 9DM-2 concerning the image pickup result VT, one low frequency component out of the two low frequency components to be composed is given offset values OF0 to OFM-1 being different from each other in addition circuits ML0 to MLM-1 or subtraction circuits ND0 to NDM-1, and after that, it is incorporated with other low frequency component in the maximum detection circuits, MAX0 to MAXM-1 or the minimum detection circuits MIN0 to MINM-1 and leveled in the average value calculation circuit 15L or 15D and also the offset values are corrected in the succeeding subtraction circuit 16 or addition circuit 17.

As mentioned above, two low frequency components are compared and incorporated to compose one low frequency component being offset; thereby, in the image pickup result VT, in an area except an edge where level change is small, the low frequency component having high resolution is made not to be selected, which makes it possible to prevent the occurrence of unnatural gradation caused by the selection of such a low frequency component of high resolution.

The low frequency components being given a plurality of kinds of offset values OF0 to OFM-1 are compared and incorporated to compose by a plurality of systems, and after that the average value is obtained; thereby, the fluctuation in the signal level of the judgement result r (i, j) caused by the discontinuity of differential coefficient generated by the maximum value detection processing and the minimum value detection processing of a comparison and composition processing, is prevented; thereby, the occurrence of unnatural gradation can be prevented.

(1-3) The Effect of the First Embodiment

According to the above configuration, a correction coefficient is generated based on the judgement result of an area to which the input image data belong, and an image pickup result is corrected by the correction coefficient; therefore, in the same area, the same coefficient is used so that the value relationship of pixel values are kept as they are, and the pixel values in the different areas can be made to be closer as occasion demands, and in an extreme case, their relationship in values can be reversed. Thereby, it is made possible to correct gradation in effectively avoiding the deterioration in partial contrast.

In this case, by the arrangement to increase the resolution of a judgement result with the approach to an edge, it is made possible to prevent the change in the correction coefficient with the approach to an edge and at the same time to prevent an excessive emphasis of an outline, in setting a correction coefficient to be able to secure the enough value in an area being apart from the edge.

By the arrangement where a judgement result is generated by a comparison output obtained in offsetting one low frequency component out of two low frequency components having different resolutions, it is made possible to avoid the selection of a low frequency component of a high resolution in the area where the change in level is small except an edge. Thereby it is made possible to prevent the occurrence of unnatural gradation caused by the selection of a low frequency component of a high resolution.

Further, in the above case, a plurality of kinds of offset values OF0 to OFM-1 are given to the low frequency components, and after they are incorporated to one with a plurality of systems, the average value is obtained. Thereby the fluctuation in the judgement results caused by the maximum value detection processing and the minimum value detection processing of a comparison and composition processing is prevented. Therefore, unnatural gradation is prevented.

Further, it is made possible to generate judgement results in such a manner that the resolution is increased smoothly with the approach to an edge in composing a plurality of outputs of low-pass filters starting from the low resolution side in order; thereby it is made possible to prevent the degradation in picture quality caused by a sudden change in the resolution of a judgement result.

(2) A Second Embodiment

FIG. 16 is a block diagram showing a gradation correction circuit to be applied to a television camera concerning the second embodiment according to the present invention. The gradation correction circuit 17 is applied in place of the gradation correction circuit 7 described in referring to FIG. 1. About the gradation correction circuit 17, the same parts as those in the gradation correction circuit 7 are denoted with the corresponding symbols and the duplicated explanation is omitted.

A quantization circuit 22 quantizes the input data again and outputs the data in decreasing the number of bits. In the present embodiment, the quantization circuit 22 executes an arithmetic processing according to the equation shown below for the pixel value x (i, j) in a quantization step Q which is set beforehand; thereby, it outputs pixel value xq (i, j) in performing a linear quantization processing for the pixel value x (i, j). The int (a) in the following equation denotes a function to omit the figures below a decimal point.

$$xq(i, j) = int\left(\frac{x(i, j)}{Q} + 0.5\right) \tag{7}$$

The area judgement filter 19 is constituted identically with the area judgement filter 9 shown in the first embodiment, excepting the point that the number of bits is different from that of the area judgement filter 9.

A lookup table (LUT) 20 constitutes the coefficient calculation circuit and outputs a correction coefficient g (i, j) in making a low frequency component r (i, j) output from the area judgement filter 19 its address. In operating as mentioned above, the lookup table 20 stores a correction coefficient LUT (i) in the No. i address.

$$LUT(i)=G(i \times Q) \tag{8}$$

According to the configuration shown in FIG. 16, by processing the input image data after quantizing them, the same effects as those obtained in the first embodiment can be obtained with a simpler constitution by far. The whole processing can be simplified by generating a correction coefficient with the lookup table, at the same time the constitution of an area partition filter can be simplified by quantizing the input data beforehand. Further, it is possible to miniaturize the lookup table.

(3) A Third Embodiment

Figure 17:
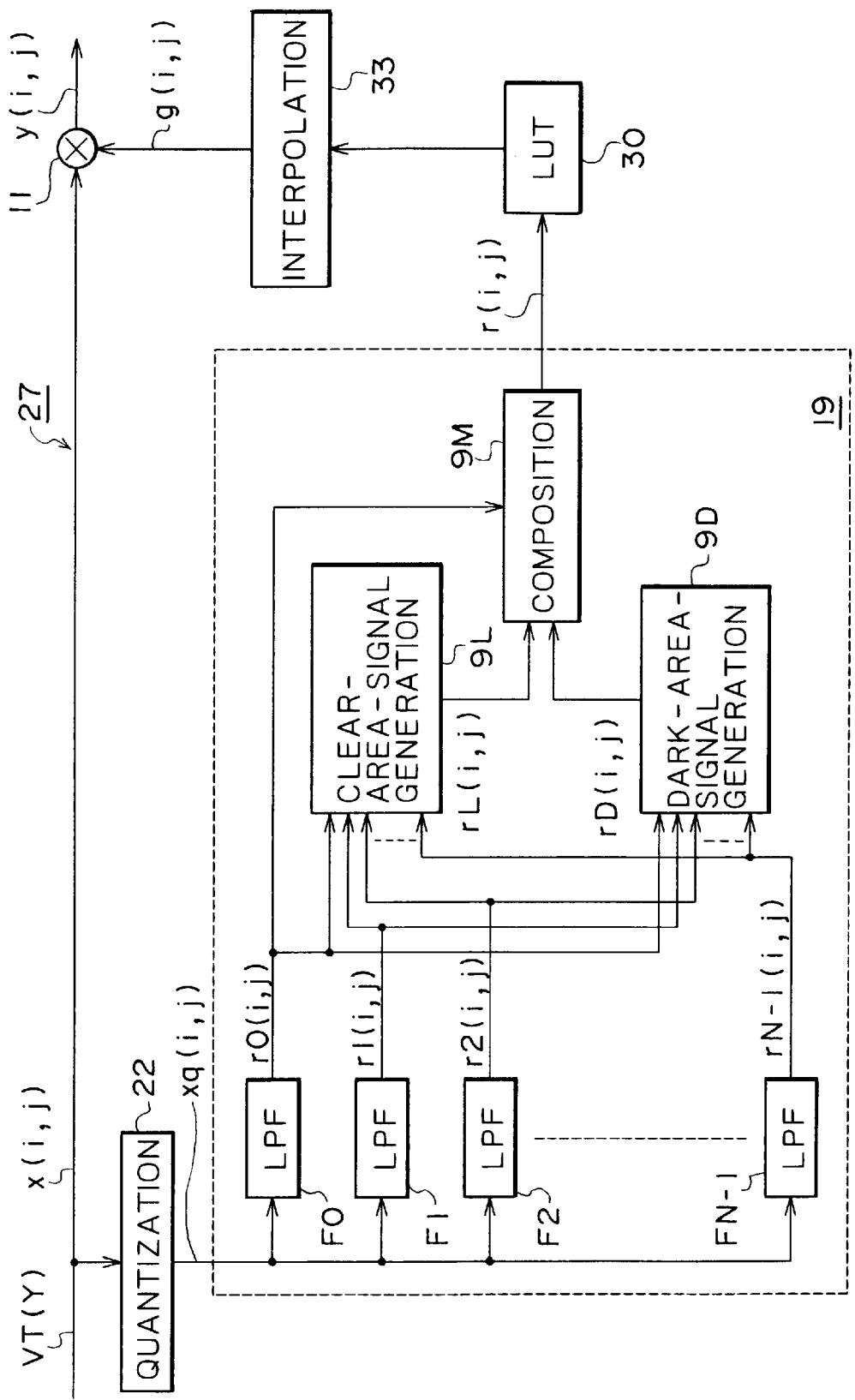
FIG. 17 shows a block diagram showing the gradation correction circuit to be applied to a television camera concerning a third embodiment according to the present invention.
Figure 21:
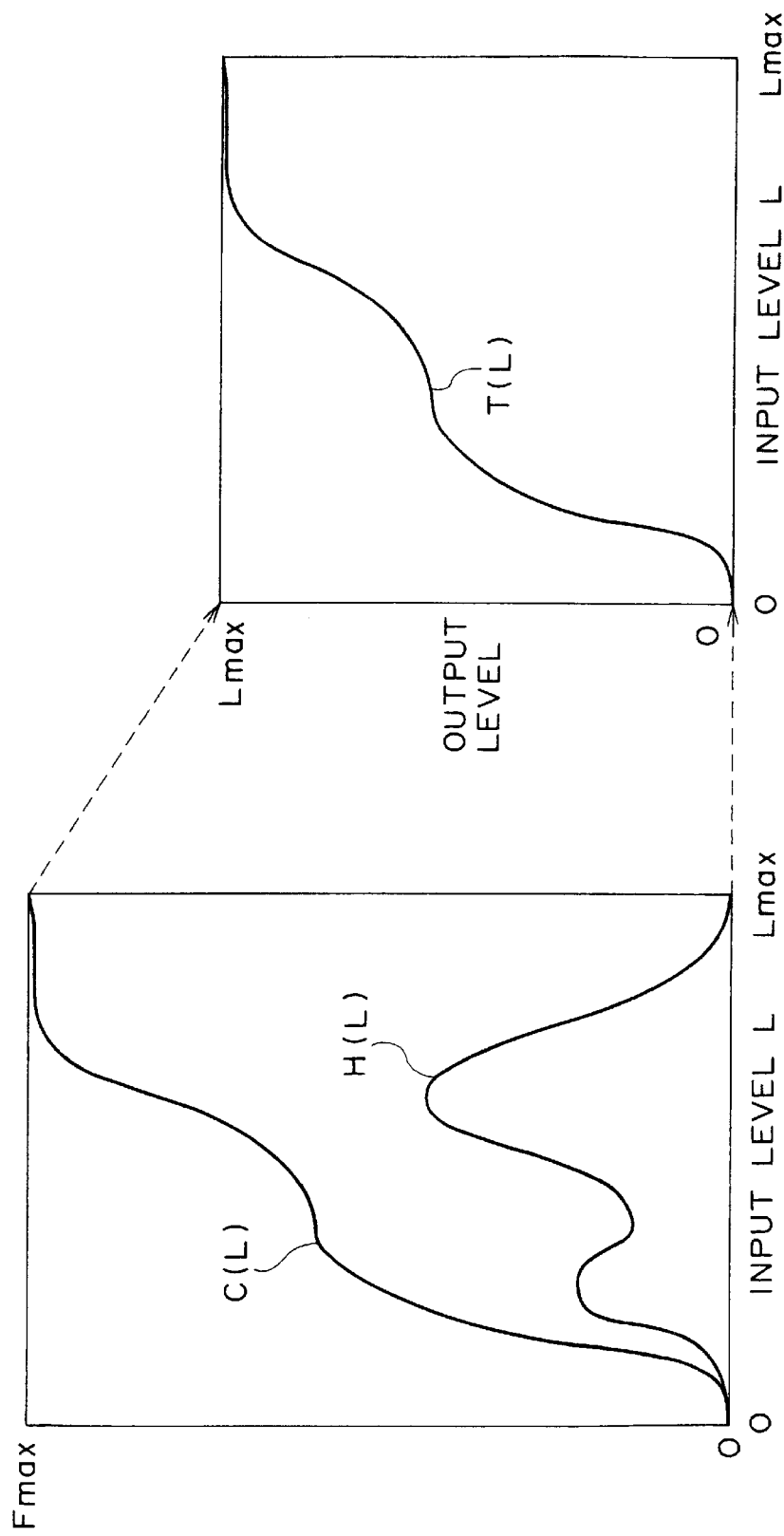
FIG. 21 shows a characteristic curve chart to be used for the explanation of a histogram equalization processing.

FIG. 17 is a block diagram showing a gradation correction circuit to be applied to a television camera concerning the third embodiment according to the present invention. The gradation correction circuit 27 is applied in place of the gradation correction circuit 17 described referring to FIG. 16, and in place of the lookup table 20 of the gradation correction circuit 17, a lookup table 30 and an interpolation circuit 33 are provided.

The lookup table 30 has an address smaller than the number of levels in which the output value r (i, j)of the area judgement filter 19 can obtain, and with an access omitted the predetermined lower order bits of the output value r (i, j), it outputs two addresses, addr0 (i, j) and addr1 (i, j), expressed in the equation shown below and correction coefficients, g0 (i, j) and g1 (i, j). Further, the lookup table 30 generates and outputs the addr0 (i, j) by outputting the output value r (i, j) of the area judgement filter 19 in omitting the lower order bits and the addr1 (i, j) by adding the bit of a logic 1 to the lowest order of the address addr0 (i, j). In the equation, Rmax denotes the maximum value which can obtain the output value r (i, j) of the area judgement filter 19, and R' max denotes the maximum value of the address which can obtain the lookup table 30.

$$addr0(i, j) = int\left(\frac{r(i, j)}{Rmax} \times R'max\right) \tag{9}$$

$$addr1(i, j) = addr0(i, j) + 1$$

The interpolation circuit 33 executes an interpolative arithmetic processing according to the following equation using the addresses, addr0 (i, j), addr1 (i, j), and the correction coefficients, g0 (i, j), g1 (i, j), which are input from the lookup table 30 and output the interpolation result as a correction coefficient g (i, j).

$$g(i, j) = \frac{r'(i, j) - addr0(i, j)}{addr1(i, j) - addr0(i, j) \times (gl(i, j) - g0(i, j) + g0(i, j))} \quad (10)$$

$$r'(i, j) = \frac{r(i, j)}{R\max} \times R'\max$$

According to the configuration as shown in FIG. 17, by generating a correction coefficient by means of an interpolative arithmetic processing, a correction coefficient which changes smoothly can be generated using a small scale lookup table, and by that much, it is made possible to correct gradation precisely.

(3) Other Embodiments

In the above embodiments, the case where the correction coefficient is generated basically by the characteristics described referring to FIG. 10 is explained; however, the present invention is not limited to this, the correction coefficient can be generated by various kinds of input/output characteristics. For example, as shown in FIG. 18, a level conversion function can be used having an input/output characteristic in which with the increase in the input level the output level turns to decreased on the way.

In other words, in the conventional method, when such a function is used, since it is not a monotonically increasing function, a pseudo outline can be produced in an image which is obtained in the result of the processing. On the contrary to this, when the processing is performed by an area judgement using low-pass filters as described in the above embodiment, in the range of an area corresponding to the passband of a low-pass filter, it is possible to prevent a change in pixel values such as the inversion of the pixel-value-relation. Thereby, the occurrence of a pseudo outline can be effectively avoided.

In the above embodiment, the case where the coefficient calculation function G is generated by the arithmetic processing shown in equation (5) using a level conversion function T is described; however, the present invention is not limited to this, and an arbitrary coefficient calculation function G can be set without using the level conversion function T.

In the above embodiment, the case where after the gradation is corrected by a gradation correction circuit, the dynamic range is oppressed by the succeeding signal processing circuit is described; however, the present invention is not limited to this, and in setting the level conversion function T and the corresponding coefficient calculation function G, these processes can be executed putting together in one.

In other words, in the oppression processing of a dynamic range, it is requested that the number of bits of the pixel value to be output is smaller than the number of bits of the pixel value to be input, so that, in the level conversion function T, when the maximum value of the output level is set to be the maximum available value to the output image, and the coefficient calculation function G is generated using the value in the above, these processes can be executed putting together in one.

In the case where an arbitrary coefficient calculation function G is set without using the level conversion function T, the coefficient calculation function will be set to satisfy the equation shown below. In the equation, j denotes an input pixel level, Lmax denotes the maximum value of the input pixel level, and L0max denotes the maximum value of the output pixel level.

$$1 \times G(L) \leq L0\max$$

$$0 \leq L\max \quad (11)$$

In the above embodiments, in the clear-area-signal generation circuit and the dark-area-signal generation circuit, the case where the low frequency signals on the low resolution side are processed in offsetting them in the positive side and negative side respectively; however the present invention is not limited to this, and it is also possible to process the low frequency signals on the high resolution side in offsetting them on the negative side and the positive side.

In the above embodiment, in the clear-area-signal generation circuit and the dark-area-signal generation circuit, the case where the composition of low frequency signals is performed in order starting from the low resolution side is described; however the present invention is not limited to this, it is also possible to compose the low frequency signals in order starting from the high resolution side, and further various kinds of other composition methods can be applied such as the case where a plurality of composition signals are generated in composing two low frequency signals having resolutions being close by and further these composition signals can be formed in the order of resolution, and so on.

In the above embodiment, the case where the judgement result of an area to which the image data belong is directly processed to prevent the excessive emphasis of an edge is described; however, the present invention is not limited to this, it is also possible to make the resolution of the correction coefficient increase in the vicinity of an edge in directly controlling the correction coefficient. In the above case, the identical effect to that obtained in the above embodiment can be obtained.

In this case, it is also possible to control the correction coefficient by generating the correction coefficients for respective low frequency signals and composing these correction coefficients in the same way as shown in the above embodiments.

In the above embodiment, the case where the judgement results are generated by composing the outputs of a plurality of low-pass filters is described; however, the present invention is not limited to this, it is also possible to make the resolution of a judgement result increase in the vicinity of an edge in varying the passband of a low-pass filter correspondingly.

In the above embodiment, the case where the offset values given in the edge correction circuits are corrected on the output sides of respective edge correction circuits is described; however, the present invention is not limited to this, and the correction processing can be executed on the side of the coefficient calculation circuit, or correction can be performed by the setting of the offset values to be given in the succeeding edge correction circuit.

In the above embodiments, the case where an image pickup result is directly processed, which is obtained in superposing a chrominance signal, being amplitude-modulated, upon a luminance signal in order by a time division system is described; however, the present invention is not limited to this, and the invention can be applied to a variety of cases such as the case where a correction coefficient is generated in separating luminance data from an image pickup result, and after that the gradation of an image pickup result is corrected using the correction coefficient, the case where a chrominance signal is processed, the case where a video signal is processed by a luminance signal and a color-difference signal or the case where a composite signal which is formed by superposing a chrominance signal upon a luminance signal is processed.

In the case of a composite video signal, a correction coefficient is generated based on a luminance signal generated by YC separation, and using the correction coefficient the gradation of a luminance signal and a chrominance signal, and a luminance signal and a color-difference signal are corrected; thereby the gradation of a video signal of this kind can be corrected.

In the case where a video signal composed of a luminance signal and a color-difference signal is processed, in the similar way to the above, a correction coefficient is calculated based on a luminance signal, and with the correction coefficient the gradation of the luminance signal and the color-difference signal is corrected. Thereby, the gradation of a video signal of this kind can be corrected.

Further, when a chrominance signal is processed, after a luminance signal is generated according to the arithmetic processing as shown below, a correction coefficient is calculated based on the luminance signal, and with the correction coefficient the gradation of respective chrominance signals is corrected; thereby, the gradation of a video signal of this kind can be corrected.

$$Y=0.3R+0.59G+0.11B \tag{12}$$

In the above embodiments, the case where an area to which the input image data belong is judged by low-pass filters using an average luminance level as the trait quantity of image data is described, however, the present invention is not limited to this, and for example, in an image, being the object of a process, the similarity between a pixel arbitrarily selected and the neighboring pixels surrounding the selected pixel is grasped as a trait quantity, and the area is gradually expanded from the pixel and the image being an object of processing is area-judged, and so on. Thus by a variety of trait quantities and a variety of processing method an image being the object of processing is area-judged and similar effects can be obtained to those obtained in the above embodiments.

In the above embodiments, the case where the present invention is applied to a television camera is described. However, the present invention is not limited to this, and the present invention can be applied to a variety of image processing devices such as television receivers, video tape recorders, printers, etc.

What is claimed is:

1. An image processing apparatus for correcting the gradation of image data comprising:

an area judgement means for outputting a judgement result in judging an area to which said image data belong, said area judgment means including low-pass filters of more than three units outputting band-limited-signals in limiting the bandwidth of said image data by different passbands from each other, and a signal composition means for outputting said judgment result in composing said band-limited-signals, said signal composition means for generating said one judgment signal in composing said band-limited-signals output from said low-pass filters in order starting from the term having the lowest value of the resolution or from the term having the highest value of the resolution, a coefficient calculation means for outputting a correction coefficient for correcting pixel values in said image data based on said judgement result, and a correction means for correcting pixel values in said image data according to said correction coefficient, said area judgement means being arranged to increase the resolution of said image data with the approach to an edge in an image formed by said judgment result.

2. An image processing apparatus according to claim 1, wherein said area judgement means comprises:

a first low-pass filter outputting a first band-limited-signal formed in limiting the bandwidth of said image data, a second low-pass filter for outputting a second band-limited-signal obtained in limiting the image data with said second low-pass filter having different passband from the first low-pass filter, and wherein said composition means comprises:

an offset means for outputting an offset signal by offsetting said first band-limited-signals, and a comparison output means for generating said judgement result obtained from the comparison result between said offset signal and said second band-limited-signal.

3. An image processing apparatus according to claim 1, wherein said area judgement means comprises:

a first low-pass filter for outputting a first band-limited-signal obtained in limiting the bandwidth of said image data, a second low-pass filter outputting a second band-limited-signal obtained in limiting the bandwidth of said image data by a passband different from that of the first band-pass filter, and wherein said signal composition means comprises:

a first offset means for outputting a first offset signal in offsetting said first band-limited-signal by the value of the first offset signal, a second offset means outputting a second offset signal in offsetting said first band-limited-signal by the value of the second offset signal being different from that of said first offset signal, a first comparison output means outputting a first comparison output signal obtained in comparing said first offset signal and said second band-limited-signal, a second comparison output means outputting a second comparison output signal obtained in comparing said second offset signal and said second band-limited-signal, and a level means for leveling said first and second comparison output signals.

4. An image processing apparatus according to claim 3, wherein said area judgement means comprises two systems of said signal composition means and a signal processing means outputs said judgement result composed of the output signals of said signal composition means of two systems, one system of said signal composition means out of said two systems processes said first and second band-limited-signals in such a manner that the resolution in the output signal of said level means is increased with the approach to said edge from a high level side, another system of said signal composition means out of said two systems processes said first and second band-limited-signals in such a manner that the resolution in the output signal of said level means is increased with the approach to said edge from a low level side, said signal processing means outputs said judgement result in composing the output signals of said level means obtained from said two systems of signal composition means.

5. An image processing apparatus according to claim 1, wherein said area judgement means comprises:
 a bandwidth-limited-signal generation means on a high level side for generating the bandwidth-limited-signal in such a manner that the resolution is increased with the approach to said edge from a high level side,
 a bandwidth-limited-signal generation means on a low level side for generating the bandwidth-limited-signal in such a manner that the resolution is increased with the approach to said edge from a low level side, and
 wherein said signal composition means generates said judgement result in composing said band-limited-signal on the high level side and said band-limited-signal on the low level side.

6. An image processing apparatus according to claim 1, wherein said area judgement means comprises a step of quantizing said image data for processing.

7. An image processing apparatus according to claim 1, wherein said correction means corrects the pixel values of said image data in multiplying said pixel values of said image data by said correction coefficient.

8. An image processing apparatus according to claim 1, wherein the number of bits of the image data output from said correction means is made smaller than the number of bits in the input image data.

9. An image processing apparatus according to claim 1, wherein said image data is the data obtained by sampling a signal at a predetermined frequency, said signal is obtained by superposing a chrominance signal amplitude-modulated, upon a luminance signal in order by a time division system.

10. An image processing apparatus according to claim 1, wherein said image data is the data obtained by sampling a luminance signal and a color-difference signal at a predetermined frequency.

11. An image processing method comprising:
 an area judgement processing for judging an area to which said image data belong and outputting the judgement result, said area judgement processing including a bandwidth-limitation-processing for outputting bandwidth-limited-signals of more than three obtained in limiting the bandwidth of said image data with low-pass filters of different passbands from each other, and a signal composition processing for outputting said judgement result composed of said band-limited-signals, said signal composition processing generates said one judgement signal composed of said bandwidth-limited-signals output from said low-pass filters in the order starting from the term of the lowest value of the resolution or from the term of the highest value of the resolution,
 a coefficient calculation processing for outputting a correction coefficient to correct the pixel values in said image data based on said judgement result, and
 a correction processing for correcting pixel values in said image data according to said correction coefficient,
 said area judgement processing generates said image data in such a manner that the resolution is increased with the approach to said edge in an image formed by said judgment result.

12. An image processing method according to claim 11, wherein said area judgement processing comprises:
 a bandwidth-limitation-processing for outputting a first and a second bandwidth-limited-signals obtained by limiting the bandwidth of said image data by low-pass filters of different passbands from each other, and
 wherein said signal composition processing comprises:
  an offset processing for outputting an offset signal in offsetting said first bandwidth-limited-signal, and
  a comparison output processing for generating said result signal from the result of comparison between said offset signal and said second bandwidth-limited-signal.

13. An signal processing method according to claim 11, wherein said area judgement processing comprises:
 a bandwidth-limitation-processing outputting the first and the second bandwidth-limited-signals obtained in limiting the band-width of said image data by low-pass filters of different pass-bands from each other, and
 wherein said signal composition processing comprises:
  a first offset processing for generating a first offset signal offsetting said first bandwidth-limited-signal by the first offset value,
  a second offset processing for generating a second offset signal in offsetting said first bandwidth-limited-signal by a second offset value being different from said first offset value,
  a first comparison output processing for generating a first comparison output signal obtained by comparing said first offset signal and said second bandwidth-limited-signal,
  a second comparison output processing for generating a second comparison output signal obtained by comparing said second offset signal and said second bandwidth-limited-signal, and
  an level processing for leveling said first and second comparison output signals.

14. An image processing method according to claim 13, wherein said area judgement processing comprises:
 two systems of said signal composition processing and also signal processing of a judgement signal for generating said judgement result by said two systems of signal composition processing,
 one system of signal composition processing out of said two systems processes said first and second bandwidth-limited-signals in such a manner that the resolution of the output signal generated by said level processing is increased with the approach to said edge from the high level side, another system of signal composition processing out of said two systems processes said first and second bandwidth-limited-signals in such a manner that the resolution of the output signal generated by said level processing is increased with the approach to said edge from the low level side, and
 the signal processing of said judgement signal outputting said judgement result obtained in composing output signals of said level processing obtained from said signal composition processes of said high level side and low level side.

15. An image processing method according to claim 11, wherein said area judgement processing comprises:
 a bandwidth-limited-signal generation processing on the high level side for generating the bandwidth-limited-signal in such a manner that the resolution is increased with the approach to said edge from the high level side,
 a bandwidth-limited-signal generation processing on the low level side for generating the bandwidth-limited-signal in such a manner that the resolution is increased with the approach to said edge from the low level side, and
 wherein said signal composition processing generates said judgement result by composing said bandwidthlimited-signal on the high level side and said bandwidth-limited-signal on the low level side.

16. An image processing method according to claim 11, wherein said area judgement processing quantizes said image data for processing.

17. An image processing method according to claim 11, wherein said correction processing corrects the pixel values of said image data in multiplying the pixel values of said image data by said correction coefficient.

18. An image processing method according to claim 11, wherein the number of bits of the image data output from said correction processing is decreased in comparison with the number of bits of the input image data.

19. An image processing method according to claim 11, wherein said image data is the data obtained in sampling a signal at a predetermined frequency, the signal being formed by superposing a chrominance signal upon a luminance signal in order by the time division system.

20. An image processing method according to claim 11, wherein said image data is the data obtained in sampling a luminance signal and a color-difference signal at a predetermined frequency.

21. An image processing apparatus for correcting the gradation of image data comprising:

an area judgement means for judging an area to which said image data belong and outputting the judgement result, said area judgment means including low-pass filters of more than three units outputting band-limited-signals in limiting the bandwidth of said image data by different passbands from each other, and a signal composition means for outputting said judgment result in composing said band-limited-signals, said signal composition means for generating said one judgment signal in composing said band-limited-signals output from said low-pass filters in order starting from the term having the lowest value of the resolution or from the term having the highest value of the resolution, a coefficient calculation means for outputting a correction coefficient for correcting the pixel values of said image data based on said judgement result, and a correction means for correcting the pixel values of said image data according to said correction coefficient, said coefficient calculation means generates said correction coefficient in such a manner that the resolution of said image data is increased with the approach to the edge in an image formed by said judgment result image data.

22. An image processing method for correcting the gradation of said image data comprising:

an area judgement processing for outputting the judgement result by judging the area to which said image data belong, said area judgement processing including a bandwidth-limitation-processing for outputting bandwidth-limited-signals of more than three obtained in limiting the bandwidth of said image data with low-pass filters of different passbands from each other, and a signal composition processing for outputting said judgement result composed of said band-limited-signals, said signal composition processing generates said one judgement signal composed of said bandwidth-limited-signals output from said low-pass filters in the order starting from the term of the lowest value of the resolution or from the term of the highest value of the resolution, a coefficient calculation processing for outputting a correction coefficient correcting the pixel values of said image data based on said judgement result, and a correction processing for correcting the pixel values of said image data according to said correction coefficient, said coefficient calculation processing generates said correction coefficient in such a manner that the resolution of said image data is increased with the approach to an edge of an image formed by said correction coefficient.

\* \* \* \* \*